US 9,788,005 B2

(12) United States Patent
Suzuki et al.

(10) Patent No.: US 9,788,005 B2
(45) Date of Patent: **\*Oct. 10, 2017**

(54) VIDEO PREDICTION ENCODING DEVICE, VIDEO PREDICTION ENCODING METHOD, VIDEO PREDICTION ENCODING PROGRAM, VIDEO PREDICTION DECODING DEVICE, VIDEO PREDICTION DECODING METHOD, AND VIDEO PREDICTION DECODING PROGRAM

(71) Applicant: NTT DOCOMO, INC., Chiyoda-ku, Tokyo (JP)

(72) Inventors: Yoshinori Suzuki, Saitama (JP); Choong Seng Boon, Yokohama (JP)

(73) Assignee: NTT DOCOMO, INC., Tokyo (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 15/357,696

(22) Filed: Nov. 21, 2016

(65) Prior Publication Data

US 2017/0070746 A1 Mar. 9, 2017

Related U.S. Application Data

(63) Continuation of application No. 14/271,423, filed on May 6, 2014, which is a continuation of application No. PCT/JP2012/074575, filed on Sep. 25, 2012.

(30) Foreign Application Priority Data

Nov. 7, 2011 (JP) .................................. 2011-243490

(51) Int. Cl.
*H04N 19/51* (2014.01)
*H04N 19/513* (2014.01)
(Continued)

(52) U.S. Cl.
CPC ......... *H04N 19/513* (2014.11); *H04N 19/124* (2014.11); *H04N 19/52* (2014.11);
(Continued)

(58) Field of Classification Search
CPC combination set(s) only.
See application file for complete search history.

(56) References Cited

U.S. PATENT DOCUMENTS 6,259,739 B1 7/2001 Kondo
6,765,964 B1 7/2004 Conklin
(Continued)

FOREIGN PATENT DOCUMENTS

CN 1870748 A 11/2006

OTHER PUBLICATIONS

International Search Report with English translation, issued Dec. 25, 2012, pp. 1-4, International Patent Application No. PCT/JP2012/074575, Japanese Patent Office, Tokyo, Japan.
(Continued)

*Primary Examiner* — Sath V Perungavoor
*Assistant Examiner* — Janese Duley
(74) *Attorney, Agent, or Firm* — Brinks Gilson & Lione

(57) ABSTRACT

A predicted signal generation unit provided in a video predictive encoding device estimates a zero-th motion vector for derivation of a zero-th predicted signal, selects a zero-th motion vector predictor similar to the zero-th motion vector, and generates zero-th side information containing a zero-th motion vector predictor index to identify the motion vector predictor and a motion vector difference determined from the zero-th motion vector and the zero-th motion vector predictor. The video predictive encoding device selects a motion vector for generation of a first predicted signal having a high correlation with a target region, generates first side information containing a first motion vector predictor
(Continued)

index to identify the motion vector as a first motion vector predictor, sets the first motion vector predictor to a first motion vector, and combines the zero-th and first predicted signals to generate a predicted signal of the target region.

2 Claims, 20 Drawing Sheets

(51) Int. Cl.
      *H04N 19/52*     (2014.01)
      *H04N 19/573*    (2014.01)
      *H04N 19/577*    (2014.01)
      *H04N 19/124*    (2014.01)
      *H04N 19/61*     (2014.01)
      *H04N 19/172*    (2014.01)
      *H04N 19/174*    (2014.01)
      *H04N 19/176*    (2014.01)
      *H04N 19/182*    (2014.01)

(52) U.S. Cl.
      CPC ......... *H04N 19/573* (2014.11); *H04N 19/577* (2014.11); *H04N 19/61* (2014.11); *H04N 19/172* (2014.11); *H04N 19/174* (2014.11); *H04N 19/176* (2014.11); *H04N 19/182* (2014.11)

(56) References Cited

U.S. PATENT DOCUMENTS

| 7,003,035 | B2 | 2/2006 | Tourapis et al. |
| 7,639,280 | B2 | 12/2009 | Nagao |
| 2004/0136461 | A1 | 7/2004 | Kondo |
| 2004/0264570 | A1 | 12/2004 | Kondo et al. |
| 2013/0064301 | A1 | 3/2013 | Guo et al. |

OTHER PUBLICATIONS

International Preliminary Report on Patentability, dated Jun. 12, 2014, pp. 1-9, issued in International Patent Application No. PCT/JP2012/074575, The International Bureau of WIPO, Geneva, Switzerland.

Lee, Chung-Lin, et al., "Bi-Prediction Combining Template and Block Motion Compensations," Sep. 11, 2011, pp. 1221-1224, IEEE International Conference on Image Processing; XP032079804.

Chen, Chun-Chi, et al., "CE1: Report of DMVD-based Bi-prediction," Mar. 16, 2011, pp. 1-17, Motion Picture Expert Group or ISO/IEC JTC1/SC29/WT11, No. m19671, MPEG Meeting, Geneva, CH; XP030048238.

Tourapis, A.M., et al., "Direct Prediction for Predictive (P) and Bidirectionally Predictive (B) frames in Video Coding," May 6, 2002, pp. 1-12, 3.JVT Meeting, 60. MPEG Meeting, Joint Video Team of ISO/IEC JTC1/SC29/WG11 and ITU-T SG. 16, No. JVT-C128; XP030005240.

Extended European Search Report, dated May 21, 2015, pp. 1-13, issued in European Patent Application No. 12848431.8, European Patent Office, Munich, Germany.

McCann, Ken, et al., "High Efficiency Video Coding (HEVC)Test Model 2 (HM 2) Encoded Description," dated Jan. 20, 2011, pp. 1-28, 4$^{th}$ Meeting of the JCT-VC; 95. MPEG Meeting, (Joint Collaborative Team on Video Coding of ISO/IEC JTC1/SC29/WT11 and ITU-T SG. 16); Jan. 20 to Jan. 28, 2011; Daegu, KR. XP030113314.

Canadian Office Action, dated Jul. 24, 2015, pp. 1-5, issued in Canadian Patent Application No. 2,854,705, Canadian Intellectual Property Office, Gatineau, Quebec, Canada.

European Office Action, dated Jan. 26, 201, pp. 1-8, issued in European Patent Application No. 12848431.8, European Patent Office, Rijswijk, The Netherlands.

Extended European Search Report, dated Jun. 10, 2016, pp. 1-12, issued in European Patent Application No. 16162303.8, European Patent Office, Munich, Germany.

Summons to Attend Oral Proceedings, dated Jun. 13, 2016, pp. 1-7, issued in European Patent Application No. 12848431.8, European Patent Office, Munich, Germany.

Canadian Office Action, dated Jun. 23, 2016, pp. 1-6, issued in Canadian Patent Application No. 2,895,631, Canadian Intellectual Property Office, Gatineau, Quebec, Canada.

Chinese Office Action with English translation, dated Jul. 4, 2016, pp. 1-14, issued in Chinese Patent Application No. 201280052624.7, State Intellectual Property Office of China, Beijing, P.R. China.

Office Action from U.S. Appl. No. 15/473,838, dated May 4, 2017, 24 pages.

Office Action in corresponding European Application No. 16162303.8, dated Dec. 19, 2016, 9 pages.

Office Action in U.S. Appl. No. 15/473,791, dated Jul. 26, 2017, 39 pages.

*Fig. 6A*

| ref_idx | List0 | List1 |
|---|---|---|
| 0 | frame_num=3 | frame_num=3 |
| 1 | frame_num=2 | frame_num=2 |
| 2 | frame_num=1 | frame_num=1 |
| 3 | frame_num=0 | frame_num=0 |

| ref_idx | List0 | List1 |
|---|---|---|
| 0 | frame_num=2 | frame_num=4 |
| 1 | frame_num=1 | frame_num=0 |

| ref_idx | List0 | List1 |
|---|---|---|
| 0 | frame_num=2 | frame_num=4 |
| 1 | frame_num=1 | frame_num=2 |
| 2 | frame_num=0 | frame_num=1 |
| 3 | frame_num=4 | frame_num=0 |

~523

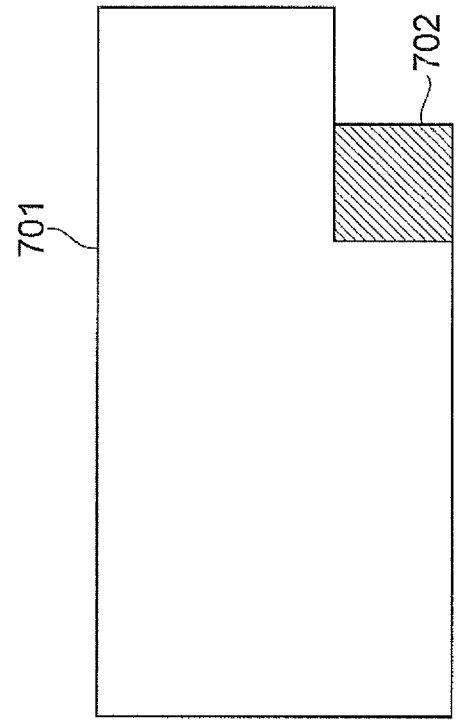
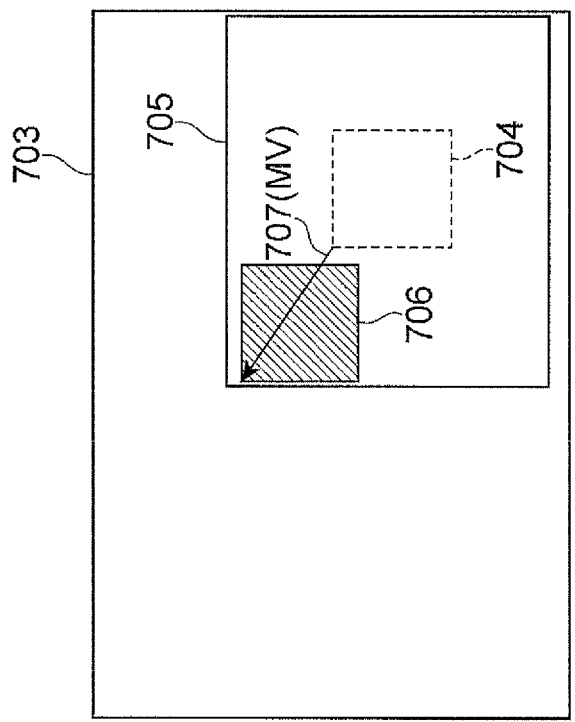
Fig. 19A
Fig. 19B

VIDEO PREDICTION ENCODING DEVICE, VIDEO PREDICTION ENCODING METHOD, VIDEO PREDICTION ENCODING PROGRAM, VIDEO PREDICTION DECODING DEVICE, VIDEO PREDICTION DECODING METHOD, AND VIDEO PREDICTION DECODING PROGRAM

This application is a continuation of U.S. application Ser. No. 14/271,423, filed May 6, 2014, which is a continuation of PCT/JP2012/074575, filed Sep. 25, 2012, which claims the benefit of the filing date pursuant to 35 U.S.C. §119(e) of JP2011-243490, filed Nov. 7, 2011, all of which are incorporated herein by reference.

TECHNICAL FIELD

The present disclosure relates to a video predictive encoding device, a video predictive encoding method, a video predictive encoding program, a video predictive decoding device, a video predictive decoding method, and a video predictive decoding program and, more particularly, the present disclosure relates to a video predictive encoding device, a video predictive encoding method, a video predictive encoding program, a video predictive decoding device, a video predictive decoding method, and a video predictive decoding program to generate a final block predicted signal (bi-predicted signal) by averaging two predicted signals.

BACKGROUND ART

Compression encoding technologies are used for efficient transmission and storage of still pictures and video data. The techniques defined in MPEG-1 to 4 and ITU (International Telecommunication Union) H.261 to H.264 are commonly used for video data.

SUMMARY

Using encoding techniques, a picture which is used as an encoding target is divided into a plurality of blocks and then an encoding process and a decoding process are carried out on a block basis. In intra-frame predictive encoding, a predicted signal is generated using a previously-reproduced neighboring picture signal (a signal reconstructed from compressed picture data) present in the same frame as a target block and then a residual signal obtained by subtracting the predicted signal from a signal of the target block is encoded. In inter-frame predictive encoding, a predicted signal is generated with compensation for motion with reference to a previously-reproduced neighboring picture signal present in a frame different from a target block, and a residual signal obtained by subtracting the predicted signal from a signal of the target block is encoded.

Intra-frame predictive encoding, such as, for example, in H.264, employs a method of generating the predicted signal by extrapolating previously-reproduced pixel values adjacent to a block as an encoding target, in predetermined directions. FIG. 20 is a schematic diagram for explaining an example intra-frame prediction method such as the method used in ITU H.264. In FIG. 20(A), a target block 802 is a block as an encoding target, and a pixel group 801 consisting of pixels A to M adjacent to a boundary of the target block 802 is a neighboring region, which is a picture signal previously reproduced in past processing.

In this case, the predicted signal is generated by downwardly extending the pixel group 801 as neighboring pixels located immediately above the target block 802. In FIG. 20(B), the predicted signal is generated by rightwardly extending previously-reproduced pixels (I to L) located on the left side of the target block 804. Methods for generation of the predicted signal are described, for example, in U.S. Pat. No. 6,765,964. A difference is calculated between each of nine predicted signals generated by the methods shown in FIGS. 20(A) to (I) in the above-described manner, and the pixel signal of the target block, and one with the minimum difference is selected as an optimum predicted signal. As described above, the predicted signal can be generated by extrapolation of pixels.

In inter-frame predictive encoding, the predicted signal can be generated by a method of searching previously-reproduced frames for a signal similar to the pixel signal of the block as an encoding target. Then a motion vector is encoded as a spatial displacement amount between the target block and a region composed of the detected signal, and a residual signal between the pixel signal of the target block and the predicted signal. The searching technique for the motion vector for each block as described above is called block matching.

FIG. 19 is a schematic diagram for explaining an example of a block matching process. The below will describe a procedure for generating a predicted signal for an example of a target block 702 on an encoding target frame 701. A reference frame 703 is a previously-reproduced picture and a region 704 is a region located spatially at the same position as the target block 702. In the block matching, a search range 705 including the region 704 is set and a region 706 with the minimum sum of absolute errors from the pixel signal of the target block 702 is detected from pixel signals in this search range 705. The signal of this region 706 is determined to be a predicted signal, and a displacement amount from the region 704 to the region 706 is detected as a motion vector 707. Also a method of preparing a plurality of reference frames 703, selecting a reference frame to be applied to block matching for each target block, and detecting reference frame selection information can be employed. In H.264, for example, a plurality of prediction types of different block sizes for encoding of motion vectors can be prepared, in order to adapt for local characteristic changes of pictures. The prediction types of H.264 are described, for example, in U.S. Pat. No. 7,003,035.

In compression encoding of video data, an encoding order of pictures (frames or fields) may be optional. For this reason, there are two techniques regarding the encoding order in inter-frame prediction which can be used to generate the predicted signal with reference to previously-reproduced frames. The first technique is uni-prediction, which generates the predicted signal with reference to one previously-reproduced frame, and the second technique is bi-prediction, which averages two predicted signals obtained with reference to one or two previously-reproduced frames. The uni-prediction technique includes forward prediction with reference to a past previously-reproduced frame in a display order, and backward prediction with reference to a future previously-reproduced frame in the display order. Examples of these types of inter-frame predictions are described, for example, in U.S. Pat. No. 6,259,739.

In an example, such as in H.264, the second inter-frame technique (bi-prediction) is performed by creating two reference frame lists each consisting of a plurality of previously-reproduced frames as candidates for reference picture 703. Block matching is carried out with the plurality of reference frames registered in each reference picture list to detect two regions corresponding to the region 706, and two predicted signals thus detected are averaged.

Examples of reference picture lists will be described with reference to FIGS. 5 and 6. In FIG. 5(A), a frame 505 indicates an encoding target picture and frames 501 to 504 indicate previously-reproduced frames. In FIG. 5(B), a frame 510 represents an encoding target frame and frames 507, 508, 509, and 511 represent previously-reproduced frames. Each picture (frame) is identified by a frame number (frame_num). In FIG. 6 List0 and List1 indicate two reference frame lists, FIG. 6(A) shows an example of reference frame lists for FIG. 5(A), and FIGS. 6(B) and (C) show examples of reference frame lists for FIG. 5(B). In FIGS. 6(A) and (C), four reference frames are registered in each reference frame list and in FIG. 6(B) two reference frames are registered in each reference frame list. Each reference frame is identified by a reference frame index (ref_idx). Any previously-reproduced pictures can be registered in the reference picture lists. In the present specification, as a non-limiting example in order to facilitate an understanding of the contents, notations of zero-th motion information and first motion information are used according to the foregoing reference frame lists List0 and List1.

In bi-prediction, noise in the predicted signal can be removed by a smoothing effect based on averaging of two similar predicted signals. However, blocks which the smoothing effect benefits most are often texture regions or flat regions including noise, and reference frames contain signals similar to those in the blocks.

Since signals of these regions have strong randomness, motion vectors between neighboring blocks can vary significantly when two predicted signals similar to a target block in these regions are detected from a plurality of reference frames. Since a motion vector is encoded as a difference from a motion vector of a neighboring block, the variation in motion vectors between neighboring blocks can lead to an increase in an amount of coding bits thereof.

As an example technique to reduce the amount of coding bits in the bi-prediction, there is a method of deriving two motion vectors according to conditions of neighboring blocks on the decoding side. It is, however, difficult to enhance the similarity of two predicted signals because of strong restrictions on available predicted signals, thus failing to achieve the satisfactory smoothing effect.

A video predictive coding system that includes a video predictive encoding device, a video predictive encoding method, a video predictive encoding program, a video predictive decoding device, a video predictive decoding method, and a video predictive decoding program capable of efficiently suppressing the noise of the predicted signal with a smaller amount of coding bits for bi-prediction to encode two motion vectors, by encoding one motion vector to generate the predicted signal similar to the target block and selectively determining the other motion vector from previously-encoded motion information.

An example embodiment of the video predictive coding system includes a video predictive encoding device comprising: region division means which divides an input picture into a plurality of regions; predicted signal generation means which determines a motion vector for deriving from a previously-reproduced picture a signal having a high correlation with a target region as an encoding target, out of the regions divided by the region division means; motion information storing means which stores the motion vector; residual signal generation means which generates a residual signal between a predicted signal of the target region and a pixel signal of the target region; residual signal compression means which compresses the residual signal generated by the residual signal generation means; residual signal reconstruction means which generates a reproduced residual signal by reconstruction from compressed data of the residual signal; encoding means which encodes a motion vector predictor similar to a motion vector of the target region selected from previously-reproduced motion vectors stored in the motion information storing means, side information determined from the motion vector of the target region, and the compressed data of the residual signal; and picture storing means which adds the predicted signal to the reproduced residual signal to reconstruct a pixel signal of the target region, and which stores the reconstructed pixel signal as the previously-reproduced picture, wherein the motion vector includes a zero-th motion vector used for generation of a zero-th predicted signal, and a first motion vector used for generation of a first predicted signal, and wherein the predicted signal generation means comprises: zero-th motion information estimation means which estimates the zero-th motion vector for derivation of the zero-th predicted signal, which selects a zero-th motion vector predictor similar to the estimated zero-th motion vector from a plurality of motion vectors stored in the motion information storing means, and which generates zero-th side information containing a zero-th motion vector predictor index to identify the motion vector predictor selected, and a motion vector difference determined from the zero-th motion vector and the zero-th motion vector predictor; first motion information estimation means which selects a motion vector for generation of the first predicted signal having a high correlation with the target region, from a plurality of motion vectors stored in the motion information storing means, which generates first side information containing a first motion vector predictor index to identify the selected motion vector as a first motion vector predictor, and which sets the first motion vector predictor to the first motion vector, and predicted signal combining means which combines the zero-th predicted signal and the first predicted signal to generate the predicted signal of the target region.

The above video predictive encoding device may be configured in an embodiment wherein the first motion information estimation means further includes functions to estimate a second motion vector for derivation of the first predicted signal, to thereby detect the second motion vector, to select a second motion vector predictor similar to the estimated second motion vector, from a plurality of motion vectors stored in the motion information storing means, and to generate second side information containing a second motion vector predictor index to identify the selected motion vector predictor, and a motion vector difference determined from the second motion vector and the second motion vector predictor, wherein the predicted signal generation means generates the first predicted signal using the first motion vector when a plurality of previously-reproduced picture stored in the picture storing means all are past pictures in a display order with respect to an encoding target picture, and the predicted signal generation means generates the fast predicted signal using the second motion vector when a plurality of previously-reproduced pictures stored in the picture storing means include a future picture in the display order with respect to the encoding target picture, and wherein the encoding means encodes indication information to indicate that the first side information is encoded, in each frame or in each slice when a plurality of previously-reproduced pictures stored in the picture storing means all are past pictures in the display order with respect to the encoding target picture, and the encoding means encodes indication information to indicate that the second side information is encoded, in each frame or in each slice when a plurality of previously-reproduced pictures stored in the picture storing means include a future picture in the display order with respect to the encoding target picture; and wherein the encoding means encodes as side information of each target region, the zero-th side information, and either the first side information or the second side information based on the indication information.

An example embodiment of the video predictive coding system includes a video predictive decoding device comprising: decoding means which decodes a compressed data out of plural sets of compressed data obtained by encoding a plurality of divided regions, the compressed data including side information and a residual signal of a target region, which is a target to be decoded; motion information reconstruction means which reconstructs a motion vector used to generate a predicted signal of the target region from the side information; motion information storing means which stores the motion vector; motion compensation means which generates the predicted signal of the target region, based on the motion vector; residual signal reconstruction means which reconstructs a reproduced residual signal of the target region from the compressed data of the residual signal; and picture storing means which adds the predicted signal to the reproduced residual signal to reconstruct a pixel signal of the decoding target region and which stores the reconstructed pixel signal as a previously-reproduced picture, wherein the decoding means decodes zero-th side information and first side information, wherein the zero-th side information contains a zero-th motion vector difference, and a zero-th motion vector predictor index to identify as a zero-th motion vector predictor one motion vector selected from a plurality of motion vectors stored in the motion information storing means, wherein the first side information contains a first motion vector predictor index to identify as a first motion vector predictor one motion vector selected from a plurality of motion vectors stored in the motion information storing means, wherein the motion information reconstruction means comprises: zero-th motion information reconstruction means which generates the zero-th motion vector predictor, based on the zero-th motion vector predictor index, and which adds the generated zero-th motion vector predictor to the zero-th motion vector difference to reconstruct a zero-th motion vector; and first motion information reconstruction means which generates the first motion vector predictor, based on the first motion vector predictor index, to reconstruct the generated first motion vector predictor as a first motion vector, and wherein the motion compensation means combines two signals obtained from the previously-reproduced picture, based on the zero-th motion vector and the first motion vector, to generate the predicted signal of the target region.

The above video predictive decoding device may be configured in an embodiment wherein the decoding means further decodes indication information to indicate whether the first side information contains a motion vector difference, in each frame or in each slice, wherein when the indication information indicates that the first side information contains a first motion vector difference, the decoding means decodes the motion vector difference as the first side information, and wherein, when the indication information indicates that the first side information does not contain the first motion vector difference, the first motion information reconstruction means generates the first motion vector predictor, based on the first motion vector predictor index, and reconstructs the generated first motion vector predictor as the first motion vector; and wherein, when the indication information indicates that the first side information contains the vector difference, the first motion information reconstruction means generates the first motion vector predictor, based on the first motion vector predictor index, and adds the generated first motion vector predictor to the decoded motion vector difference to generate and reconstruct the first motion vector.

The video predictive coding system can also be understood as a video predictive encoding method, a video predictive decoding method, a video predictive encoding program, and a video predictive decoding program, which can be described as below.

An example embodiment of the video predictive encoding method can be executed by a video predictive encoding device, comprising: a region division step of dividing an input picture into a plurality of regions; a predicted signal generation step of determining a motion vector for deriving from a previously-reproduced picture a signal having a high correlation with a target region as an encoding target, out of the regions divided by the region division step; a motion information storing step of storing the motion vector in motion information storing means; a residual signal generation step of generating a residual signal between a predicted signal of the target region and a pixel signal of the target region; a residual signal compression step of compressing the residual signal generated by the residual signal generation step; a residual signal reconstruction step of generating a reproduced residual signal by reconstruction from compressed data of the residual signal; an encoding step of selecting and encoding a motion vector predictor similar to a motion vector of the target region, the target motion vector selected from: previously-reproduced motion vectors stored in the motion information storing means, side information determined from the motion vector of the target region, and the compressed data of the residual signal; and a picture storing step of adding the predicted signal to the reproduced residual signal to reconstruct a pixel signal of the target region, and storing the reconstructed pixel signal as the previously-reproduced picture in picture storing means, wherein the motion vector includes a zero-th motion vector used to generate a zero-th predicted signal, and a first motion vector used to generate a first predicted signal, and wherein the predicted signal generation step comprises: a zero-th motion information estimation step of estimating the zero-th motion vector for derivation of the zero-th predicted signal, selecting a zero-th motion vector predictor similar to the estimated zero-th motion vector from a plurality of motion vectors stored in the motion information storing step, and generating zero-th side information containing a zero-th motion vector predictor index to identify the motion vector predictor selected, and a motion vector difference determined from the zero-th motion vector and the zero-th motion vector predictor, a first motion information estimation step of selecting, from a plurality of motion vectors stored in the motion information storing step, a motion vector having a high correlation with the target region for generation of the first predicted signal, generating first side information containing a first motion vector predictor index to identify the selected motion vector as a first motion vector predictor, and setting the first motion vector predictor as the first motion vector, and a predicted signal combining step of combining the zero-th predicted signal and the first predicted signal to generate the predicted signal of the target region.

The above video predictive encoding method may be configured in an embodiment wherein in the first motion information estimation step, the video predictive encoding device further estimates a second motion vector for derivation of the first predicted signal, to detect the second motion vector, selects a second motion vector predictor similar to the estimated second motion vector from a plurality of motion vectors stored in the motion information storing step, and generates second side information containing a second motion vector predictor index to identify the motion vector predictor selected, and a motion vector difference determined from the second motion vector and the second motion vector predictor, wherein in the predicted signal generation step, the video predictive encoding device generates the first predicted signal using the first motion vector when a plurality of previously-reproduced pictures stored in the picture storing means all are past pictures in a display order with respect to an encoding target picture, and the video predictive encoding device generates the first predicted signal using the second motion vector when a plurality of previously-reproduced pictures stored in the picture storing means include a future picture in the display order with respect to the encoding target picture, and wherein in the encoding step, when a plurality of previously-reproduced pictures stored in the picture storing means all are past pictures in the display order with respect to the encoding target picture, the video predictive encoding device encodes indication information to indicate that the first side information is encoded, in each frame or in each slice; when a plurality of previously-reproduced pictures stored in the picture storing means include a future picture in the display order with respect to the encoding target picture, the video predictive encoding device encodes indication information to indicate that the second side information is encoded, in each frame or in each slice; and wherein in the encoding step, the video predictive encoding device encodes as side information of each target region, the zero-th side information, and either the first side information or the second side information based on the indication information.

An embodiment of the video predictive coding system includes a video predictive decoding method executed by a video predictive decoding device, comprising: a decoding step of decoding a compressed data out of plural sets of compressed data obtained by decoding a plurality of divided regions, the compressed data comprising side information and a residual signal of a decoding target region which is target to be decoded; a motion information reconstruction step of reconstructing a motion vector used to generate a predicted signal of the target region from the side information; a motion information storing step of storing the motion vector in motion information storing means; a motion compensation step of generating the predicted signal of the target region, based on the motion vector; a residual signal reconstruction step of reconstructing a reproduced residual signal of the target region from the compressed data of the residual signal; and a picture storing step of adding the predicted signal to the reproduced residual signal to reconstruct a pixel signal of the decoding target region, and storing the reconstructed pixel signal as a previously-reproduced picture, wherein in the decoding step, the video predictive decoding device decodes zero-th side information and first side information, wherein the zero-th side information contains a zero-th motion vector difference, and a zero-th motion vector predictor index to identify as a zero-th motion vector predictor one motion vector selected from a plurality of motion vectors stored in the motion information storing step, wherein the first side information contains a first motion vector predictor index to identify as a first motion vector predictor one motion vector selected from a plurality of motion vectors stored in the motion information storing step, wherein the motion information reconstruction step comprises: a zero-th motion information reconstruction step of generating the zero-th motion vector predictor, based on the zero-th motion vector predictor index, and adding the generated zero-th motion vector predictor to the zero-th motion vector difference to reconstruct a zero-th motion vector; and a first motion information reconstruction step of generating the first motion vector predictor, based on the first motion vector predictor index, to reconstruct the generated first motion vector predictor as a first motion vector, and wherein in the motion compensation step, the video predictive decoding device combines two signals derived from the previously-reproduced picture, based on the zero-th motion vector and the first motion vector, to generate the predicted signal of the target region.

The above video predictive decoding method may be configured in an embodiment wherein in the decoding step, the video predictive decoding device further decodes indication information to indicate whether the first side information contains a motion vector difference, in each frame or in each slice, wherein when the indication information indicates that the first side information contains a first motion vector difference, the video predictive decoding device decodes the motion vector difference as the first side information, and wherein in the first motion information reconstruction step, when the indication information indicates that the first side information does not contain the first motion vector difference, the video predictive decoding device generates the first motion vector predictor, based on the first motion vector predictor index, and reconstructs the generated first motion vector predictor as the first motion vector, and wherein in the first motion information reconstruction step, when the indication information indicates that the first side information contains the first motion vector difference, the video predictive decoding device generates the first motion vector predictor, based on the first motion vector predictor index, and adds the generated first motion vector predictor to the decoded motion vector difference to generate and reconstruct the first motion vector.

An embodiment of the video predictive coding system includes a video predictive encoding program for letting a computer function as: region division means which divides an input picture into a plurality of regions; predicted signal generation means which determines a motion vector for deriving from a previously-reproduced picture a signal having a high correlation with a target region as an encoding target, out of the regions divided by the region division means; motion information storing means which stores the motion vector, residual signal generation means which generates a residual signal between a predicted signal of the target region and a pixel signal of the target region; residual signal compression means which compresses the residual signal generated by the residual signal generation means; residual signal reconstruction means which generates a reproduced residual signal by reconstruction from compressed data of the residual signal; encoding means which encodes a motion vector predictor, similar to a motion vector of the target region, selected from: previously-reproduced motion vectors stored in the motion information storing means, side information determined from the motion vector of the target region, and the compressed data of the residual signal; and picture storing means which adds the predicted signal to the reproduced residual signal to reconstruct a pixel signal of the target region, and which stores the reconstructed pixel signal as the previously-reproduced picture, wherein the motion vector includes a zero-th motion vector used to generate a zero-th predicted signal, and a first motion vector used to generate a first predicted signal, and wherein the predicted signal generation means comprises: zero-th motion information estimation means which estimates the zero-th motion vector for derivation of the zero-th predicted signal, which selects a zero-th motion vector predictor similar to the estimated zero-th motion vector from a plurality of motion vectors stored in the motion information storing means, and which generates zero-th side information containing a zero-th motion vector predictor index to identify the motion vector predictor selected, and a motion vector difference determined from the zero-th motion vector and the zero-th motion vector predictor; first motion information estimation means which selects a motion vector for generation of the first predicted signal having a high correlation with the target region, from a plurality of motion vectors stored in the motion information storing means, which generates first side information containing a first motion vector predictor index to identify the selected motion vector as a first motion vector predictor, and which sets the first motion vector predictor to the first motion vector; and predicted signal combining means which combines the zero-th predicted signal and the first predicted signal to generate the predicted signal of the target region.

The above video predictive encoding program may be configured in an embodiment wherein the first motion information estimation means further has a function to estimate a second motion vector for derivation of the first predicted signal, to detect the second motion vector, to select a second motion vector predictor similar to the second motion vector estimated, from a plurality of motion vectors stored in the motion information storing means, and to generate second side information containing a second motion vector predictor index to identify the motion vector predictor selected, and a motion vector difference determined from the second motion vector and the second motion vector predictor, wherein the predicted signal generation means generates the first predicted signal using the first motion vector when a plurality of previously-reproduced picture stored in the picture storing means all are past pictures in a display order with respect to an encoding target picture, and the predicted signal generation means generates the first predicted signal using the second motion vector when a plurality of previously-reproduced pictures stored in the picture storing means include a future picture in the display order with respect to the encoding target picture, and wherein the encoding means encodes indication information to indicate that the first side information is encoded, in each frame or in each slice when a plurality of previously-reproduced pictures stored in the picture storing means all are past pictures in the display order with respect to the encoding target picture, and the encoding means encodes indication information to indicate that the second side information is encoded, in each frame or in each slice when a plurality of previously-reproduced pictures stored in the picture storing means include a future picture in the display order with respect to the encoding target picture; and wherein the encoding means encodes as side information of each target region, the zero-th side information, and either the first side information or the second side information based on the indication information.

An embodiment of the video predictive coding system includes a video predictive decoding program for letting a computer function as: decoding means which decodes a compressed data out of plural sets of compressed data obtained by decoding a plurality of divided regions, the compressed data comprising side information and a residual signal of a decoding target region, which is a target to be decoded; motion information reconstruction means which reconstructs a motion vector used to generate a predicted signal of the target region from the side information; motion information storing means which stores the motion vector, motion compensation means which generates the predicted signal of the target region, based on the motion vector; residual signal reconstruction means which reconstructs a reproduced residual signal of the target region from the compressed data of the residual signal; and picture storing means which adds the predicted signal to the reproduced residual signal to reconstruct a pixel signal of the decoding target region and which stores the reconstructed pixel signal as a previously-reproduced picture, wherein the decoding means decodes zero-th side information and first side information, wherein the zero-th side information contains a zero-th motion vector difference, and a zero-th motion vector predictor index to identify as a zero-th motion vector predictor one motion vector selected from a plurality of motion vectors stored in the motion information storing means, wherein the first side information contains a first motion vector predictor index to identify as a first motion vector predictor one motion vector selected from a plurality of motion vectors stored in the motion information storing means, wherein the motion information reconstruction means comprises: zero-th motion information reconstruction means which generates the zero-th motion vector predictor, based on the zero-th motion vector predictor index, and which adds the generated zero-th motion vector predictor to the zero-th motion vector difference to reconstruct a zero-th motion vector; and first motion information reconstruction means which generates the first motion vector predictor, based on the first motion vector predictor index, to reconstruct the generated first motion vector predictor as a first motion vector, and wherein the motion compensation means combines two signals derived from the previously-reproduced picture, based on the zero-th motion vector and the first motion vector, to generate the predicted signal of the target region.

The above video predictive decoding program may be configured in an embodiment wherein the decoding means further decodes indication information to indicate whether the first side information contains a motion vector difference, in each frame or in each slice, wherein when the indication information indicates that the first side information contains a first motion vector difference, the decoding means decodes the motion vector difference as the first side information, and wherein, when the indication information indicates that the first side information does not contain the first motion vector difference, the first motion information reconstruction means generates the first motion vector predictor, based on the first motion vector predictor index, and reconstructs the generated first motion vector predictor as the first motion vector; and wherein, when the indication information indicates that the first side information contains the vector difference, the first motion information reconstruction means generates the first motion vector predictor, based on the first motion vector predictor index, and adds the generated first motion vector predictor to the decoded motion vector difference to generate and reconstruct the first motion vector.

The video predictive encoding device, video predictive encoding method, video predictive encoding program, video predictive decoding device, video predictive decoding method, and video predictive decoding program enable designation of one motion vector effective for the bi-prediction, based on the previously-encoded motion information, and thus achieve the effect to enhance the performance of the bi-prediction with a smaller amount of coding bits.

Other systems, methods, features and advantages will be, or will become, apparent to one with skill in the art upon examination of the following figures and detailed description. It is intended that all such additional systems, methods, features and advantages be included within this description, be within the scope of the disclosure, and be protected by the following claims.

BRIEF DESCRIPTION OF THE DRAWINGS

FIGS. 6A through 6C are drawings to illustrate examples of reference frame lists.

FIGS. 19A and 19B are schematic diagrams to illustrate an example of a motion estimation process in inter-frame prediction.

DETAILED DESCRIPTION OF THE PREFERRED EMBODIMENTS

Embodiments of the video predictive coding system will be described below with reference to the accompanying drawings. In the description of the drawings identical or equivalent elements will be denoted by the same reference signs, without redundant description. Furthermore, "frames," "pictures," and "images" (501 to 511 in FIG. 5) have the same meaning in the description in the present specification.

Figure 1:
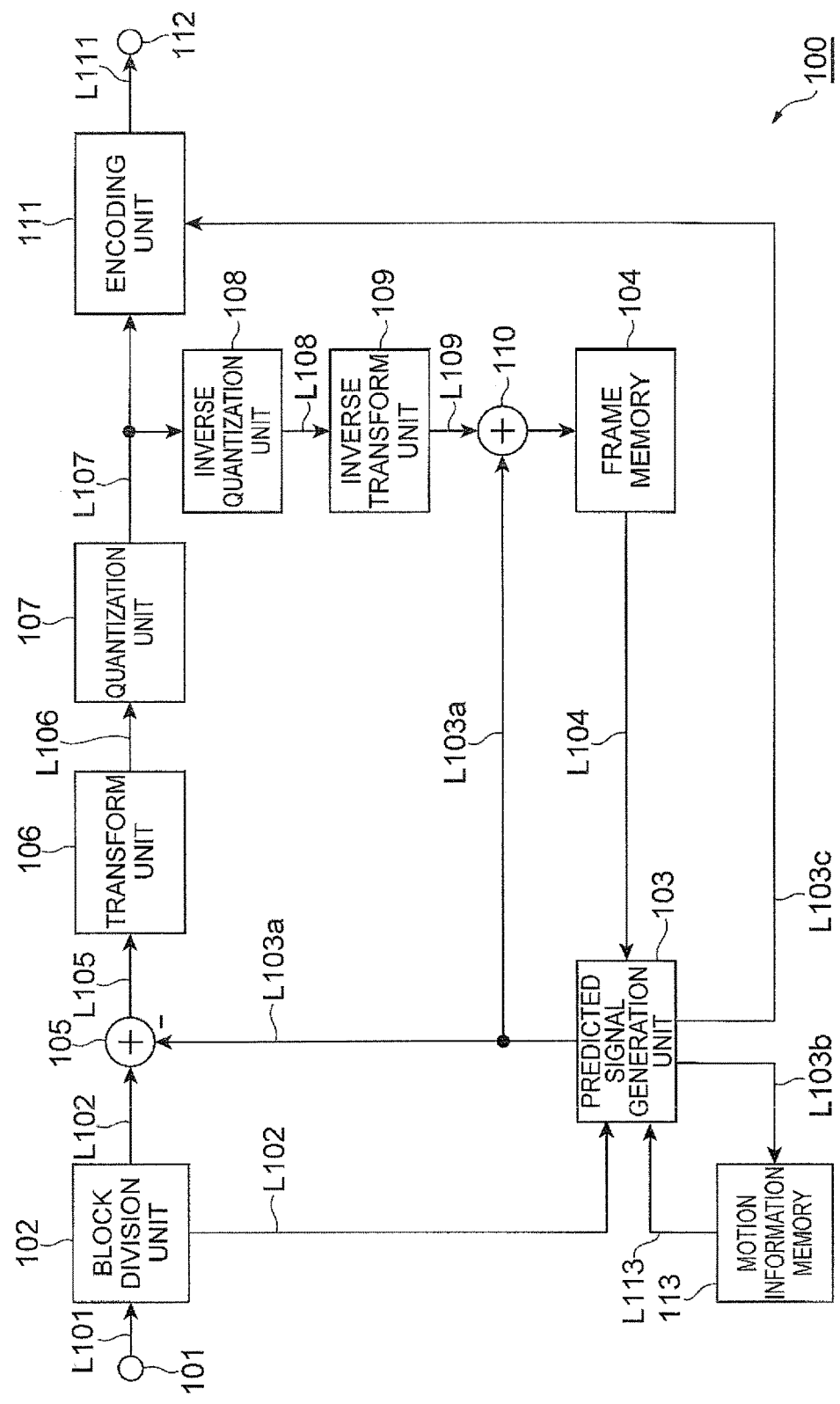
FIG. 1 is a block diagram showing an example of a video predictive encoding device according to an embodiment.

FIG. 1 is a block diagram showing an example of a video predictive encoding device 100 according to an embodiment of the predictive video coding system. This video predictive encoding device 100 is provided with circuitry that includes an input terminal 101, a block division unit 102, a predicted signal generation unit 103, a frame memory 104, a subtraction unit 105, a transform unit 106, a quantization unit 107, an inverse quantization unit 108, an inverse transform unit 109, an addition unit 110, an encoding unit 111, an output terminal 112, and a motion information memory 113. The transform unit 106 and quantization unit 107 can function as a residual signal compression unit or circuit, the inverse quantization unit 108 and inverse transform unit 109 can function as residual signal reconstruction unit or circuit, and the motion information memory can function as a motion information storage unit. The motion information memory 113 may be included in the predicted signal generation unit 103. As used herein, the term "unit" is interchangeable with the term "circuit" to describe hardware that may also execute software to perform the described functionality. The video predictive encoding device 100 may be a computing device or computer, including circuitry in the form of hardware, or a combination of hardware and software, capable of performing the described functionality. The video predictive encoding device 100 may be one or more separate systems or devices included in the video predictive coding system, or may be combined with other systems or devices within the video predictive coding system. In other examples, fewer or additional units may be used to illustrate the functionality of the predictive video encoding device 100. The input terminal 101 is a terminal that implements input of a signal of a video sequence consisting of a plurality of pictures.

The block division unit 102 divides a picture as an encoding target, which is represented by a signal input from the input terminal 101, into a plurality of regions (target blocks or target regions). In the present embodiment the encoding target picture is divided into blocks each consisting of 8×8 pixels, but the target picture may be divided into blocks of any other size or shape. Furthermore, blocks of different sizes may be mixed in a frame.

The predicted signal generation unit 103 detects motion information used to generate a predicted signal of each predictive block in a target block and generates the predicted signal. Furthermore, it generates side information used for reconstruction of the motion information in a decoding device. There are no restrictions on a predicted signal generation method, but methods applicable herein include the inter-frame prediction (uni-prediction or bi-prediction) and the intra-frame prediction (the intra-frame prediction is not illustrated) as described in the background art.

In the present embodiment the predicted signal is generated by bi-prediction. A piece of motion information in the bi-prediction is detected using a picture signal acquired via L104 so as to minimize the sum of absolute errors between the original signal of the target block fed via L102 and the bi-predicted signal, by the block matching shown in FIG. 19. Then another piece of motion information is generated based on previously-encoded motion information.

Since the present embodiment describes the bi-prediction, the motion information is composed of zero-th motion information and first motion information, each of which contains a reference frame index (ref_idx[0] or ref_idx[1]) and a motion vector (mv[0][0/1] or mv[1][0/1]). Reference frame candidates for the zero-th motion information are indicated by List0 in FIG. 6 and reference frame candidates for the first motion information are indicated by List1 in FIG. 6. [0/1] herein is information to identify a horizontal component and a vertical component of each vector. The description of [0/1] will be omitted hereinafter (and also omitted similarly in the drawings).

The reproduced pictures to be registered in the reference frame lists shown in FIG. 6 may be automatically determined according to a predetermined rule or may be explicitly encoded in frame unit or in sequence unit. On this occasion, the frame number can be used to identify each reference frame as shown in FIG. 5 and FIG. 6.

The motion information generated by the predicted signal generation unit 103 is output via L103b to the motion information memory 113.

The motion information memory 113 stores the input motion information. The stored motion information is fed via L113 to the predicted signal generation unit to be used for encoding of motion information of a subsequent block.

The side information generated by the predicted signal generation unit 103 is output via L103c to the encoding unit 111.

The predicted signal generated by the predicted signal generation unit 103 is output via L103a to the subtraction unit 105 and to the addition unit 110.

The subtraction unit 105 subtracts the predicted signal for the target block fed via line L103a, from the pixel signal of the target block fed via line L102 after the division in the block division unit 102, to generate a residual signal. The subtraction unit 105 outputs the residual signal obtained by the subtraction, via line L105 to the transform unit 106.

The transform unit 106 is a part that transforms the input residual signal by a discrete cosine transform. The quantization unit 107 is a part that quantizes transform coefficients obtained by the discrete cosine transform by the transform unit 106.

The encoding unit 111 entropy encodes the side information fed from the predicted signal generation unit and the quantized transform coefficients fed from the quantization unit 107, and the encoded data is output via L111 to the output terminal 112. There are no restrictions on a method of the entropy encoding, but applicable methods include arithmetic coding, variable-length coding, and so on.

The output terminal 112 outputs the information fed from the encoding unit 111, together to the outside.

The inverse quantization unit 108 inversely quantizes the quantized transform coefficients. The inverse transform unit 109 reconstructs a residual signal by an inverse discrete cosine transform. The addition unit 110 adds the reconstructed residual signal to the predicted signal fed via L103a, to reproduce a signal of the encoding target block, and stores the signal in the frame memory 104. The present embodiment employs the transform unit 106 and the inverse transform unit 109, but it is also possible to use other transform processing in place of these transform units. It is also noted that the transform unit 106 and the inverse transform unit 109 are not always essential. In this manner, the reproduced signal of the encoding target block thus encoded is reconstructed by the inverse process and stored in the frame memory 104, in order to be used in generation of the predicted signal of the subsequent encoding target block.

Next, the predicted signal generation unit 103 will be described in detail. Then, first, the motion information, predictive motion information, and side information will be described.

As described above, the motion information in the bi-prediction is composed of the zero-th motion information and the first motion information, each of which contains a reference frame index (ref_idx[0] or ref_idx[1]) and a motion vector (mv[0] or mv[1]). The reference frame candidates for the zero-th motion information are indicated by List0 in FIG. 6 and the reference frame candidates for the first motion information are indicated by List1 in FIG. 6.

In the bi-prediction of the present embodiment, the predicted signal generation unit 103 uses the previously-encoded motion information as predictive motion information. The previously-encoded motion information contains motion information associated with neighboring blocks previously encoded, and previously-encoded motion information of a target region. The motion information associated with neighboring blocks refers to motion information used in generation of the predicted signal when each neighboring block was an encoding target, and is stored in the motion information memory 113.

The predictive motion information is also composed of zero-th predictive motion information and first predictive motion information, each of which contains a reference frame index (ref_idx[0] or ref_idx[1]) and a motion vector (mv[0] or mv[1]). Reference frame candidates for the zero-th predictive motion information are indicated by List0 in FIG. 6 and reference frame candidates for the first predictive motion information are indicated by List1 in FIG. 6.

A specific utilization method of the predictive motion information is to generate a motion vector predictor, based on the zero-th predictive motion information, in delta encoding of the motion vector of the zero-th motion information detected by block matching with reference to the reference frames in List0. The first motion information using the reference frames in List1 is generated based on the first predictive motion information.

Figure 7:
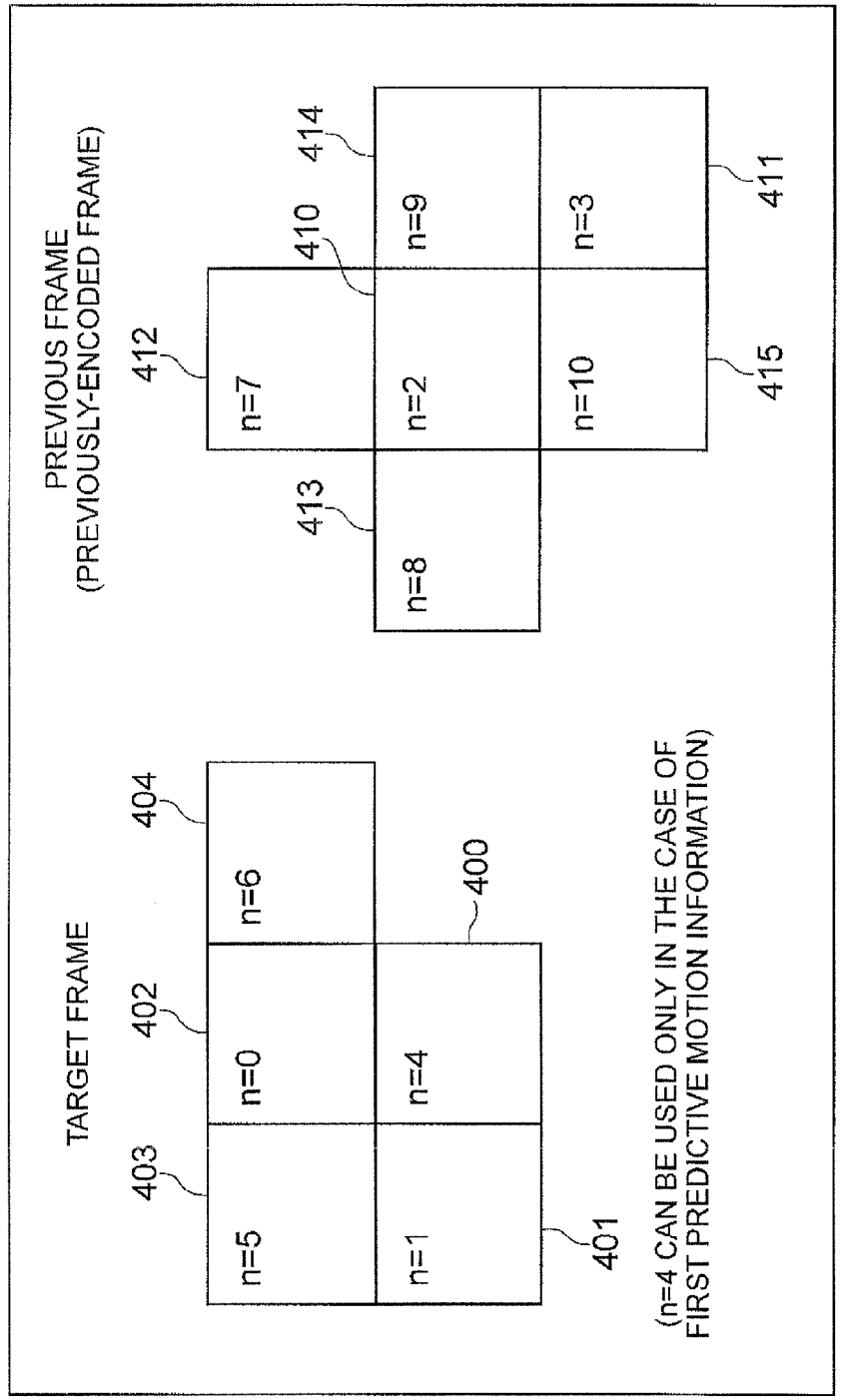
FIG. 7 is a drawing to illustrate an example of neighboring blocks.

An example of the predictive motion information will be described with reference to FIG. 7. A block 400 shown in FIG. 7 is a target block, and pieces of motion information associated with blocks 401 to 404 adjacent thereto are candidates for the predictive motion information. The motion information of each neighboring block contains the zero-th motion information and the first motion information. The both may be defined as candidates for the predictive motion information or the predictive motion information may be limited to either one of them (e.g., in the case of prediction of N-th motion information, only the N-th motion vector of each neighboring block is defined as a candidate).

Furthermore, a block 410 represents a block located spatially at the same position as the block 400, (or a co-located block) in a reference frame. Pieces of motion information associated with the block 410 and blocks 411 to 415 adjacent thereto are candidates for the predictive motion information. n represents a number to identify a candidate for the predictive motion information and each selected candidate is indicated by a motion vector predictor index (mvp_idx[0] or mvp_idx[1]). In the present embodiment, the zero-th motion information is first encoded and, for this reason, the zero-th motion information associated with the block 400 can also be used as the first predictive motion information (n=4 in the example).

The positions and numbers of the candidates for the predictive motion information can be those predefined between the encoder side and the decoder side, and there are no restrictions thereon. The number of candidates for the predictive motion information may be predetermined between the encoder side and the decoder side, or may be encoded and provided to the decoder.

If a reference frame identified by ref_idx of the predictive motion information is different from a reference frame identified by ref_idx of the target block, a scaling process of the motion vector in the predictive motion information may be performed based on the frame numbers of the encoding target frame and the two reference frames. Specifically, the motion vector in the predictive motion information is scaled in order to be converted into a motion vector designating the reference frame identified by ref_idx of the target block, and the converted motion vector obtained by the conversion is used as a motion vector predictor (pmv[0][0/1] or pmv[1][0/1]). On this occasion, the reference frame index (ref_idx[0] or ref_idx[1]) in the predictive motion information is updated to the reference frame index (ref_idx[0] or ref_idx[1]) of the target block. [0/1] herein is information to identify a horizontal component and a vertical component of each vector. The description of [0/1] will be omitted hereinafter (and also omitted similarly in the drawings).

The side information is composed of zero-th side information and first side information. The zero-th side information contains ref_idx[0], a motion vector difference (mvd[0][0/1]=mv[0][0/1]−pmv[0][0/1]), and mvp_idx[0]. The first side information contains ref_idx[1] and mvp_idx[1]. Since mv[1][0/1]=pmv[1][0/1] in the present embodiment, vector values of mvd[1][0/1] are always 0. Therefore, mvd[1][0/1] can be reconstructed on the decoder side without being encoded and, for this reason, it does not have to be included in the first side information. [0/1] herein is information to identify a horizontal component and a vertical component of each vector. The description of [0/1] will be omitted hereinafter (and also omitted similarly in the drawings).

Figure 2:
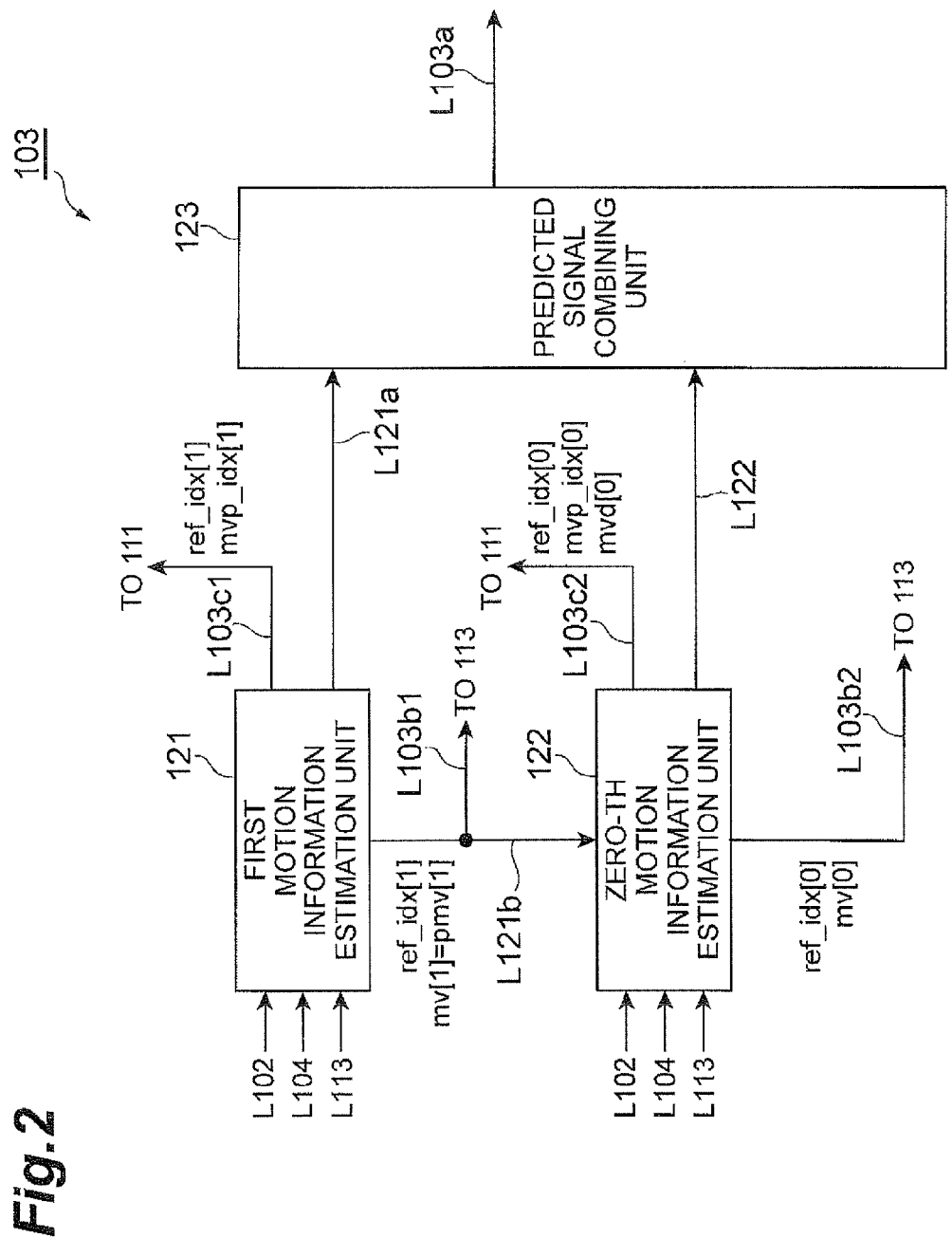
FIG. 2 is a block diagram to illustrate an example of a predicted signal generation unit shown in FIG. 1.

FIG. 2 is a block diagram showing an example configuration of the predicted signal generation unit 103 according to the present embodiment. This predicted signal generation unit 103 is provided with a first motion information estimation unit 121, a zero-th motion information estimation unit 122, and a predicted signal combining unit 123.

The first motion information estimation unit 121 uses the reference frames in List1 input via L104, to select a set of a first predictive motion information candidate and a reference frame index to generate a first predicted signal most similar to the original signal of the target block fed via L102, from candidates for the first predictive motion information fed via L113 (wherein motion vector predictors are obtained by scaling motion vectors according to reference frame indexes). The first motion information estimation unit 121 outputs the first predicted signal via L121a to the predicted signal combining unit 123 and outputs the first motion information generated based on the selected first predictive motion information and reference frame index, via L121b and via L103b1 to the zero-th motion information estimation unit 122 and to the motion information memory 113, respectively. Furthermore, it generates first side information and outputs the first side information via L103c1 to the encoding unit 111.

The zero-th motion information estimation unit 122 uses the first motion information input via L121b and the reference frames in List1 input via L104, to generate the first predicted signal. Then the zero-th motion information estimation unit 122 searches the reference frames in List0 input via L104, for a candidate for a zero-th predicted signal, and detects zero-th motion information to minimize the sum of absolute differences between a bi-predicted signal generated from the first predicted signal and the candidate for the zero-th predicted signal obtained by the search, and the original signal of the target block input via L102. Then it outputs the zero-th predicted signal generated from the detected zero-th motion information, via L122 to the predicted signal combining unit 123. It also outputs the zero-th motion information via L103b2 to the motion information memory 113. Furthermore, it generates zero-th side information and outputs the zero-th side information via L103c2 to the encoding unit 111.

It is also allowable to first execute the processing by the zero-th motion information estimation unit 122 to derive the zero-th motion information and the zero-th side information prior to the zero-th predicted signal. In this case, the zero-th motion information estimation unit 122 detects the zero-th motion information to minimize the sum of absolute differences between a predicted signal generated from the zero-th predicted signal candidate obtained by the search, and the original signal of the target block input via L102. Then the first motion information estimation unit 121 executes the processing, using the zero-th predicted signal. For example, the first motion information estimation unit 121 uses the reference frames in List1 input via L104, to generate a candidate for the first predicted signal from among candidates for the first predictive motion information input via L113 (wherein motion vector predictors are obtained by scaling motion vectors according to reference frame indexes), and selects a set of a first predictive motion information candidate and a reference frame index such that a bi-predicted signal generated from the zero-th predicted signal and the first predicted signal candidate most approximates, or is similar to, the original signal of the target block input via L102. This modification can be implemented by feeding the zero-th motion information to the first motion information estimation unit 121.

The predicted signal combining unit 123 averages the first predicted signal and the zero-th predicted signal input via L121a and L122, to generate a predicted signal of the target block and outputs the predicted signal via L103a to the subtraction unit 105 and the addition unit 110.

Figure 3:
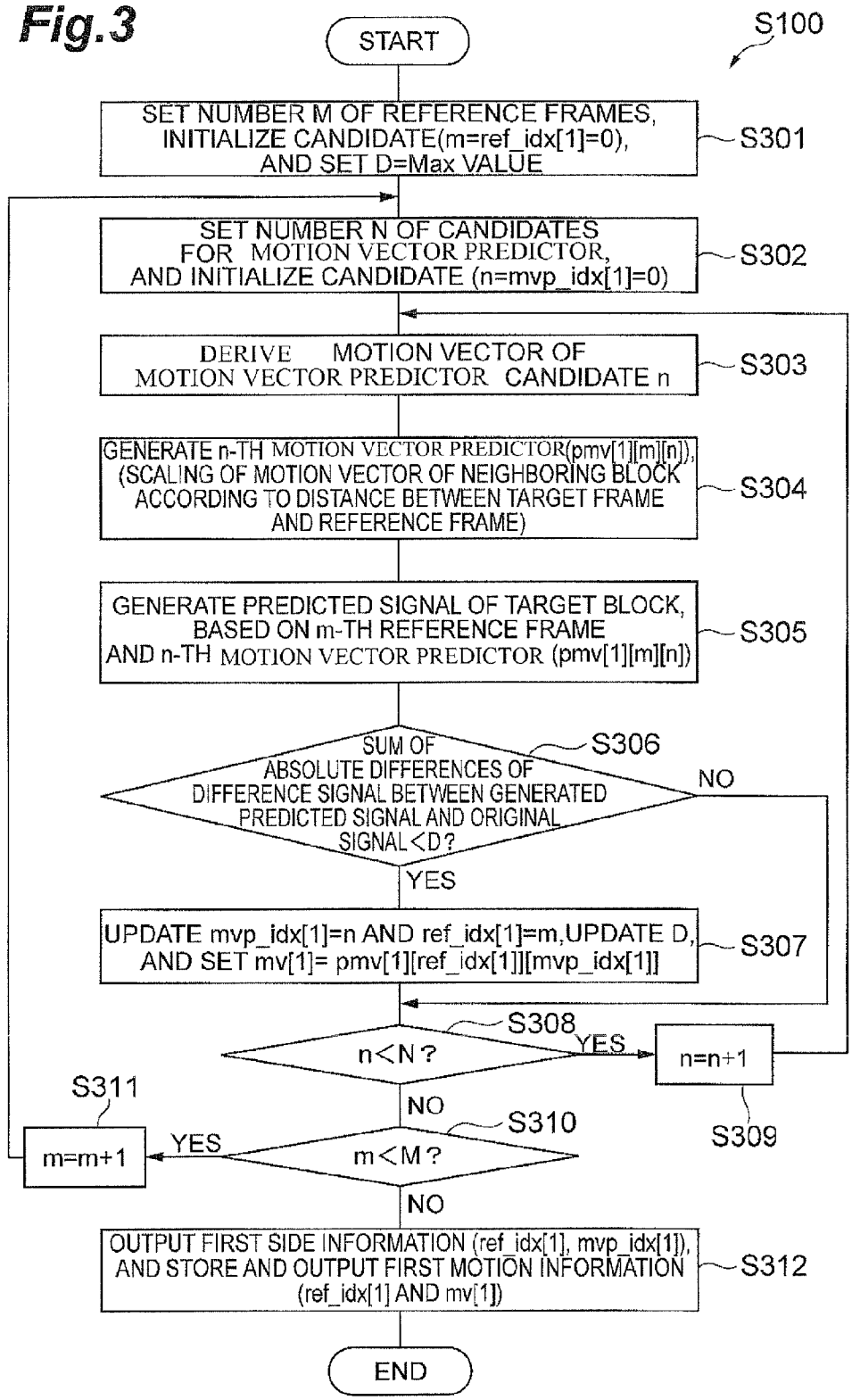
FIG. 3 is a flowchart to illustrate an example of a first motion estimation process shown in FIG. 2.

FIG. 3 shows a flowchart of example operation of the first motion information estimation unit 121. First, step S301 is to set M (M=4 in FIGS. 6(A) and (C), or M=2 in FIG. 6(B)) for the number of reference frames in List1 used in the prediction of the target block, and set 0 for the reference frame index ref_idx[1] of List1 contained in the first motion information, to initialize a count m for the reference frame number in List1 to 0. Furthermore, a motion vector evaluation value D is set at a Max value. Next, step S302 is to set N for the number of candidates for motion vector predictor (N=11 in FIG. 7, provided that when the first motion information estimation unit 121 is carried out prior to the zero-th motion information estimation unit 122, n=4 is skipped because the zero-th motion information of block 400 is not determined yet), and set 0 for the motion vector predictor index mvp_idx[1] contained in the first side information, to initialize a count n for the predictive motion information number to 0.

Next, step S303 is to derive a motion vector of motion vector predictor candidate n from the motion vectors of the neighboring blocks and step S304 is to generate the n-th motion vector predictor pmv[1][m][n][0/1] (where [0/1] is information to identify a horizontal component and a vertical component of the vector, and the description of [0/1] will be omitted hereinafter as well as in the drawings). On this occasion, the motion vector of the neighboring block is scaled according to a distance between the target frame and the reference frame (or according to frame numbers identified by reference frame indexes) to obtain the motion vector predictor. Thereafter, step S305 is to generate the predicted signal of the target block, based on the m-th reference frame and the n-th scaled motion vector predictor (pmv[1][m][n]), and step S306 is to determine whether the sum of absolute differences of a residual signal between the generated predicted signal and the original signal of the target block is smaller than the motion vector evaluation value D. When the sum of absolute differences is not less than the motion vector evaluation value D, the processing proceeds to step S308. When the sum of absolute differences is smaller than the motion vector evaluation value D, the processing proceeds to step S307 to update the motion vector predictor index mvp_idx[1] contained in the first side information, to n, update the reference frame index ref_idx[1] to m, and update the motion vector evaluation value D to the sum of absolute differences of the residual signal between the predicted signal and the original signal of the target block calculated in step S306. Furthermore, the motion vector mv[1] in the first motion information is set to the motion vector predictor pmv[1][ref_idx[1]] [mvp_idx[1]] and the reference frame index is set to ref_idx[1]. Thereafter, the processing proceeds to step S308.

Step S308 is to determine whether the value of n is smaller than N; when n is smaller than N, the processing proceeds to step S309; when n reaches N, the processing proceeds to step S310. Step S309 is to add 1 to the value of n and then the processing returns to step S303. Thereafter, the steps from S303 to S307 are repeatedly carried out until n reaches N. Step S310 is to determine whether the value of m is smaller than M; when m is smaller than M, the processing proceeds to step S311 to add 1 to the value of m and then returns to step S302. Thereafter, the steps from S302 to S309 are repeatedly carried out until m reaches M. When m reaches M, step S312 is carried out to output the first side information (ref_idx[1], mvp_idx[1]) to the encoding unit 111, store the first motion information (ref_idx[1] and mv[1]) into the motion information memory 113, and output the first motion information to the zero-th motion information estimation unit 122, followed by end of processing.

Figure 4:
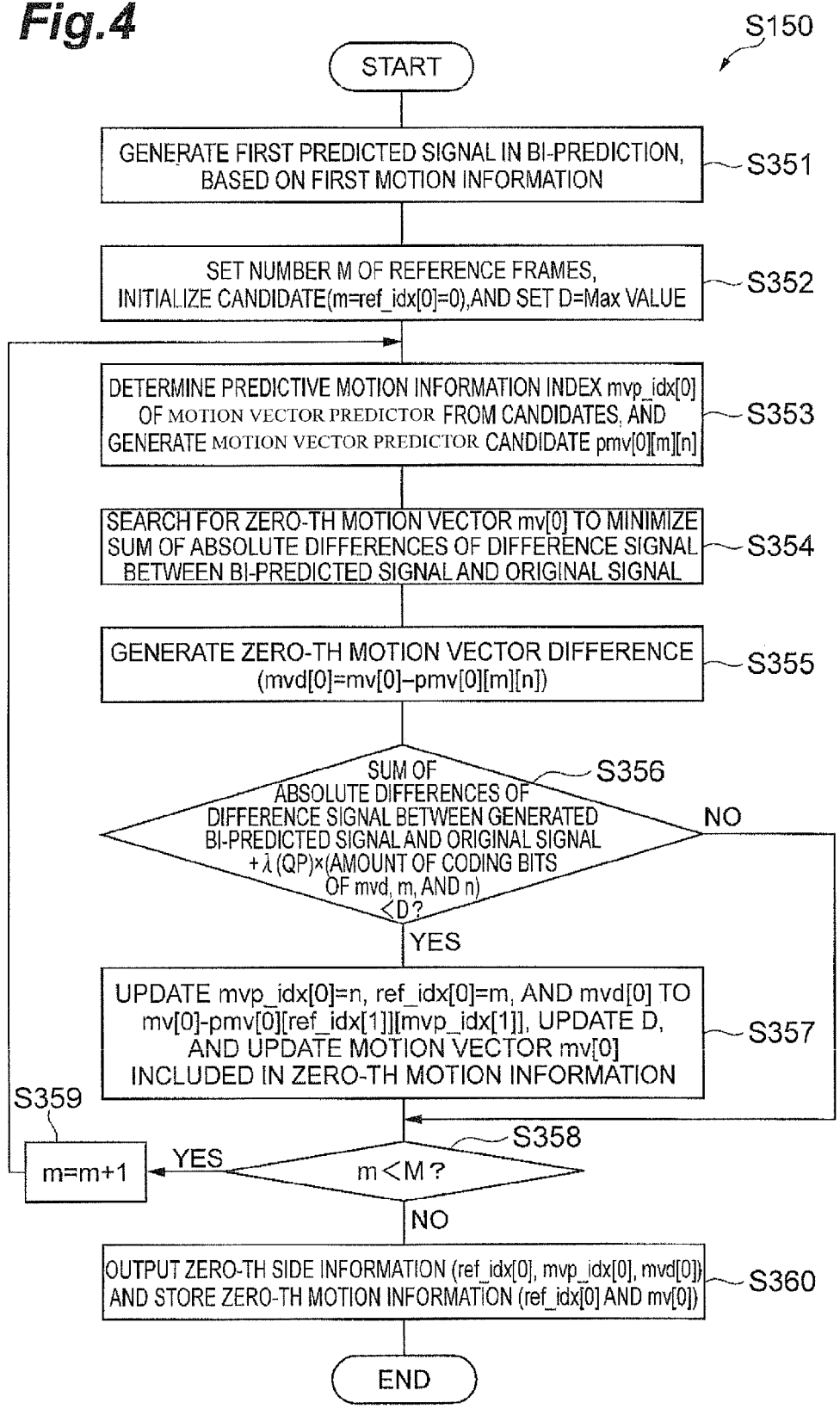
FIG. 4 is a flowchart to illustrate an example of a zero-th motion estimation process shown in FIG. 2.

FIG. 4 shows a flowchart of example operation of the zero-th motion information estimation unit 122. First, step S351 is to generate the first predicted signal in the bi-prediction, based on the first motion information. Next, step S352 is to set M (M=4 in FIGS. 6(A) and (C), or M=2 in FIG. 6(B)) for the number of reference frames in List0 used in the prediction of the target block, and set 0 for the reference frame index ref_idx[0] of List0 contained in the zero-th motion information, to initialize the count m for the reference frame number in List0 to 0. Furthermore, the motion vector evaluation value D is set at a Max value. Next, step S353 is to determine the motion vector predictor index mvp_idx[0] to identify a motion vector predictor used in difference encoding of the zero-th motion vector, from a plurality of candidates. A selection method herein can be, for example, the technique shown in steps S303 to S309 in FIG. 3. Then a motion vector predictor candidate pmv[0][m][n] is generated. On this occasion, a motion vector predictor is obtained by scaling the motion vector of the neighboring block according to a distance between the target frame and the reference frame (or according to the frame numbers identified by reference frame indexes), as described in step S304 of FIG. 3.

Next, step S354 is to acquire the reference frame indicated by ref_idx[0], which is stored in the frame memory 104, and to search for the zero-th motion vector mv[0] to minimize the sum of absolute differences of the residual signal between the bi-predicted signal obtained by averaging together with the first predicted signal, and the original signal. Subsequently, step S355 is to generate the zero-th motion vector difference mvd[0] (=mv[0]−pmv[0][m][n]). Thereafter, step S356 is to determine whether the total of the sum of absolute differences of the residual signal between the generated bi-predicted signal and the original signal of the target block, and a code amount evaluation value of the zero-th side information (mvd[0] and m and n) (which is defined by λ(QP)×(an amount of coding bits of mvd, m, and n), where λ is a weight value determined by parameter QP to define quantization accuracy in quantization of transform coefficients obtained by transform of a prediction error signal) is smaller than the motion vector evaluation value D. When the total of the sum of absolute differences+the code amount evaluation value is not less than the motion vector evaluation value D, the processing proceeds to step S358. When the total of the sum of absolute differences+the code amount evaluation value is smaller than the motion vector evaluation value D, the processing proceeds to step S357 to update the motion vector predictor index mvp_idx[0] in the zero-th side information to n, update the reference frame index ref_idx[0] to m, update the motion vector difference mvd[0] to (mv[0]−pmv[0][ref_idx[1]][mvp_idx[1]]), and update D to the total of the sum of absolute differences of the residual signal between the bi-predicted signal and the original signal of the target block+the code amount evaluation value calculated in step S356. Furthermore, the motion vector mv[0] in the zero-th motion information is updated. Thereafter, the processing proceeds to step S358.

Step S358 is to determine whether the value of m is smaller than M; when m is smaller than M, the processing proceeds to step S359 to add 1 to the value of m, and returns to step S353. Thereafter, the steps from S353 to S359 are repeatedly carried out until m reaches M. When m reaches M, step S360 is carried out to output the zero-th side information (ref_idx[0], mvd[0], mvp_idx[0]) to the encoding unit 111 and store the zero-th motion information (ref_idx[0] and mv[0]) into the motion information memory 113, followed by end of processing.

It is noted that the zero-th motion information estimation unit 122 may first execute the processing to first determine the zero-th motion information and the zero-th side information prior to the zero-th predicted signal. In this case, step S351 in FIG. 4 is omitted and step S356 is modified to determine the sum of absolute differences of the residual signal between the zero-th predicted signal, instead of the bi-predicted signal, and the original signal. In FIG. 3, it becomes possible to utilize the zero-th motion information indicated by n=4 in FIG. 7, as a candidate for the predictive motion information. This modification can be implemented by adding a step of generating the zero-th predicted signal in the bi-prediction based on the zero-th motion information and modifying step S306 so as to calculate the sum of absolute differences of the residual signal between the bi-predicted signal generated by averaging the first predicted signal and the zero-th predicted signal thus generated, and the original predicted signal.

In this manner, the first motion vector in the bi-prediction is generated based on the previously-encoded motion information, and the identification information to identify the reference frame index and the predictive motion information from a plurality of candidates as shown in the examples of FIGS. 6 and 7, is encoded instead of the motion vector, this method allows the encoding device to generate one similar signal which is similar to a signal of a target block of a texture region with high randomness or a flat region including noise, with a smaller amount of coding bits. Furthermore, the search is conducted on the reference frame to detect and encode the zero-th motion vector to generate the second similar signal, whereby an effect to enhance the smoothing effect of bi-predicted signal can be expected, when compared to the case where the two motion vectors are obtained both from the previously-encoded motion information.

Figure 9:
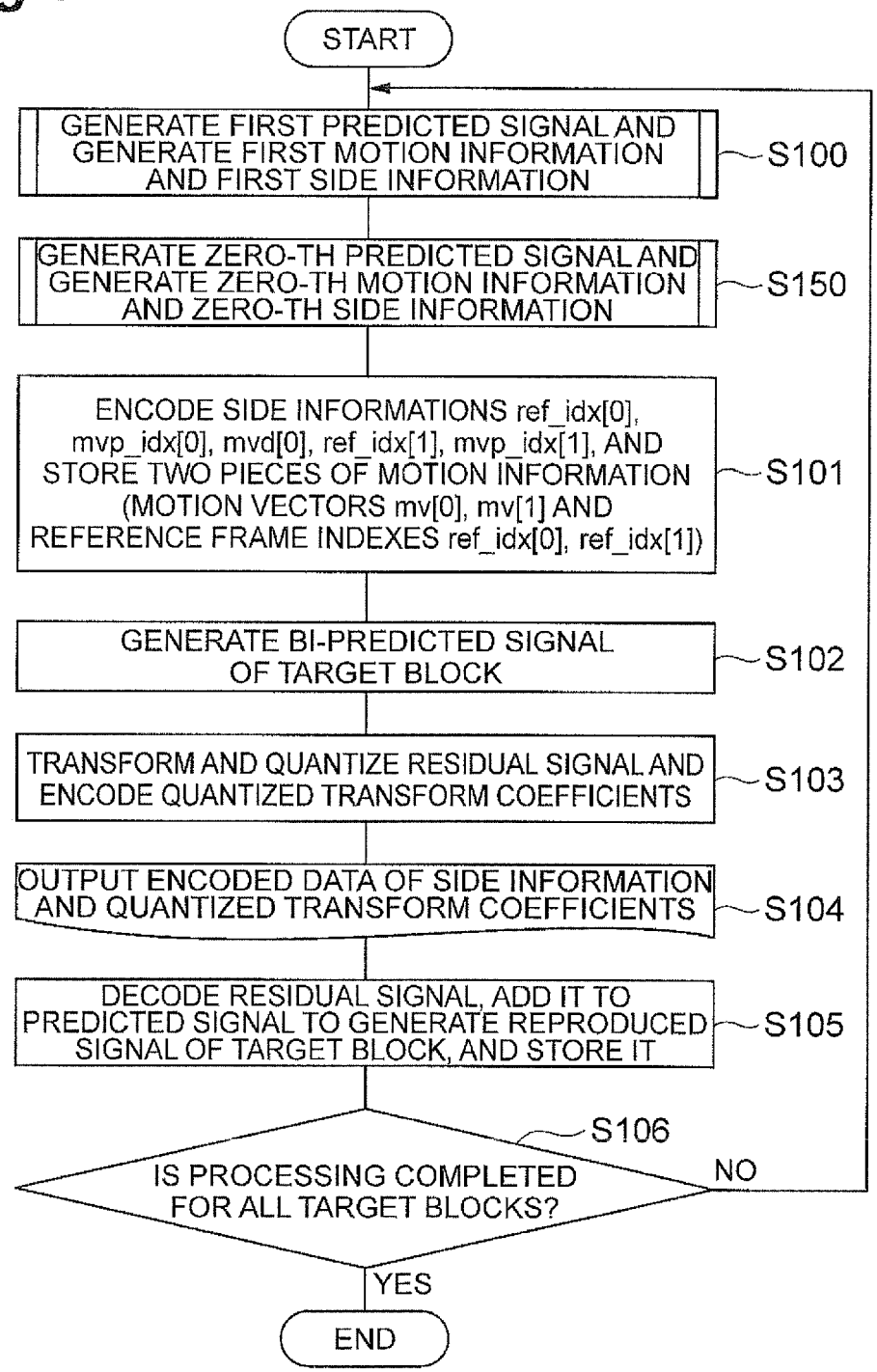
FIG. 9 is a flowchart showing an example of a video predictive encoding method of the video predictive encoding device shown in FIG. 1.

FIG. 9 is a flowchart showing an example procedure of a video predictive encoding method in the video predictive encoding device 100. First, the block division unit 102 divides an input picture into 8×8 encoding blocks (the input picture may be divided into blocks of any other size or shape, or blocks of different sizes may be mixed in an input picture).

First, the first motion information estimation unit 121 forming the predicted signal generation unit 103 generates the first predicted signal similar to a target block, using the reference frames in List1 obtained from the frame memory 104 and the candidates for first predictive motion information obtained from the motion information memory, and also generates the first motion information and the first side information used for generation of the first predicted signal (step S100). The details of this step were already described with FIG. 3. Next, the zero-th motion information estimation unit 122 generates the zero-th predicted signal similar to the target block, using the reference frames in List0 obtained from the frame memory 104 and the candidates for zero-th predictive motion information obtained from the motion information memory, and the first motion information obtained from the first motion information estimation unit 121, and also generates the zero-th motion information and the zero-th side information used for generation of the zero-th predicted signal (step S150). The details of this step were already described with FIG. 4.

Next, the encoding unit 111 entropy encodes the zero-th side information and the first side information and stores the zero-th motion information and the first motion information into the motion information memory 113 (step S101). Subsequently, in step S102, the predicted signal combining unit 123 forming the predicted signal generation unit 103 averages the zero-th predicted signal and the first predicted signal to generate a bi-predicted signal of the target block. A residual signal indicative of a difference between the pixel signal of the encoding target block and the predicted signal is transformed and encoded by the transform unit 106, quantization unit 107, and encoding unit 111 (step S103). The encoded data of the side information and quantized transform coefficients is output via the output terminal 112 (step S104). For predictive encoding of a subsequent encoding target block, the inverse quantization unit 108 and the inverse transform unit 109 decode the encoded residual signal after these processes, or in parallel with these processes. Then the addition unit 110 adds the decoded residual signal to the predicted signal to reproduce a signal of the encoding target block. The reproduced signal is stored as a reference frame in the frame memory 104 (step S105). Unless the processing is completed for all encoding target blocks, the processing returns to step S100 to perform the processing for the next encoding target block. When the processing is completed for all the encoding target blocks, the processing is terminated (step S106).

Figure 10:
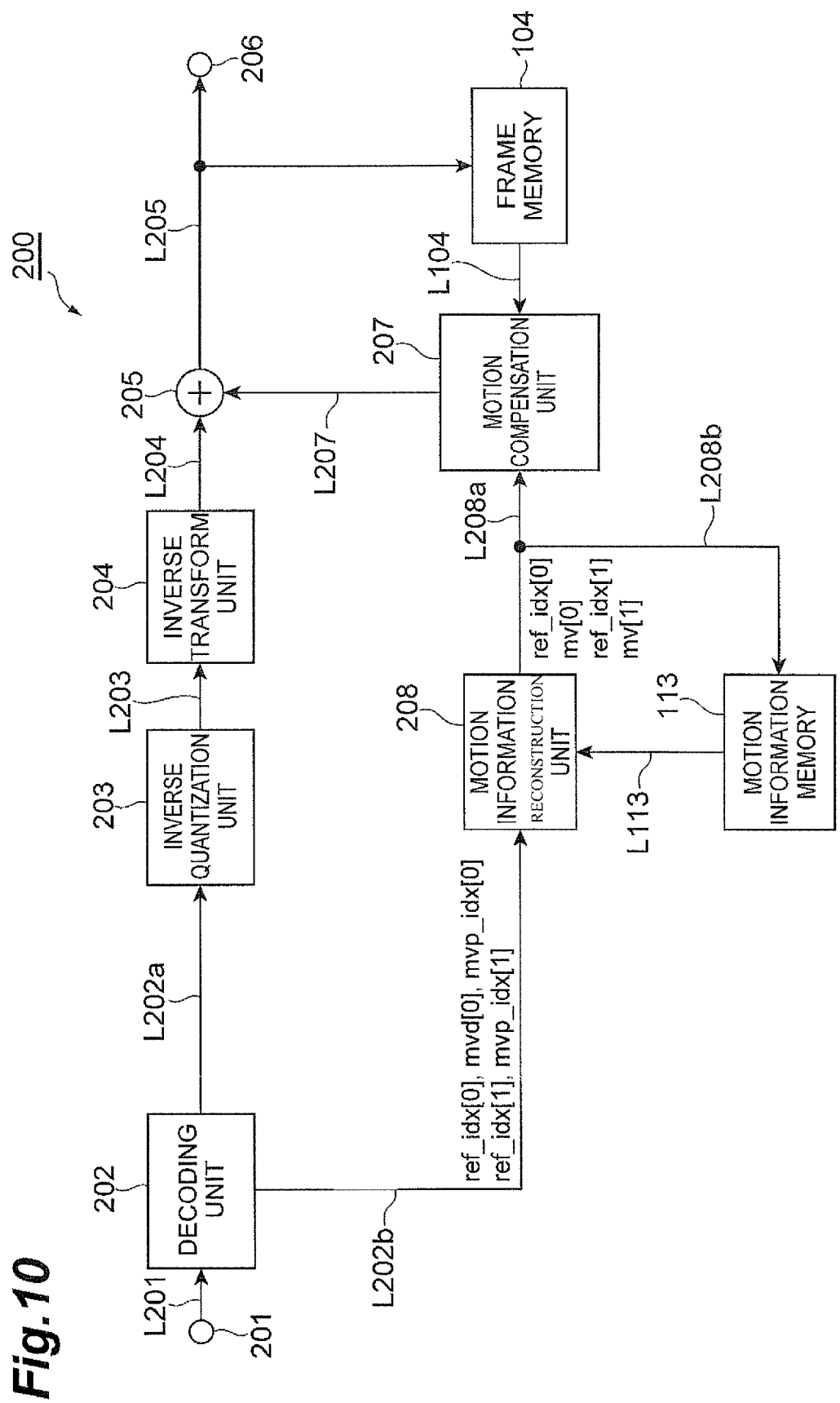
FIG. 10 is a block diagram showing an example of a video predictive decoding device according to an embodiment.

Next, a video predictive decoding method according to embodiments of the predictive video coding system will be described. FIG. 10 is a block diagram showing an example of a video predictive decoding device 200 according to the present embodiment. This video predictive decoding device 200 is provided with circuitry that includes an input terminal 201, a decoding unit 202, an inverse quantization unit 203, an inverse transform unit 204, an addition unit 205, an output terminal 206, a motion compensation unit 207, a motion information reconstruction unit 208, a frame memory 104, and a motion information memory 113. The inverse quantization unit 203 and inverse transform unit 204 function as residual signal reconstruction unit or circuit and the motion information memory 113 functions as motion information storage unit. The decoding function performed by the inverse quantization unit 203 and the inverse transform unit 204 may be any means other than these. Furthermore, the inverse transform unit 204 may be omitted. The video predictive decoding device 200 may be a computing device or computer, including circuitry in the form of hardware, or a combination of hardware and software, capable of performing the described functionality. The video predictive decoding device 200 may be one or more separate systems or devices included in the video predictive coding system, or may be combined with other systems or devices within the video predictive coding system. In other examples, fewer or additional units may be used to illustrate the functionality of the predictive video decoding device 200.

The input terminal 201 implements input of compressed data resulting from compression encoding by the aforementioned video predictive encoding method. This compressed data contains encoded data of information of quantized transform coefficients obtained by transformation and quantization of error signals and entropy encoding of transform coefficients, and encoded data of the zero-th side information and the first side information for generation of bi-predicted signals of blocks, for a plurality of divided encoding blocks.

The decoding unit 202 analyzes the compressed data input from the input terminal 201, separates the data into the encoded data of quantized transform coefficients and the encoded data of side information about each decoding target block, performs entropy decoding thereof, and outputs the decoded data via L202a and via L202b to the inverse quantization unit 203 and to the motion information reconstruction unit 208, respectively.

The motion information reconstruction unit 208 receives the zero-th side information (ref_idx[0], mvd[0], mvp_idx [0]) and the first side information (ref_idx[1], mvp_idx[1]) via L202b and reconstructs the zero-th motion information (ref_idx[0], mv[0]) and the first motion information (ref_idx [1], mv[1]), using the previously-decoded motion information acquired via L113. The reconstructed zero-th motion information and first motion information is output via L208a and via L208b to the motion compensation unit 207 and to the motion information memory 113, respectively. The motion information memory stores the motion information.

The motion compensation unit 207 acquires previously-reproduced signals from the frame memory 104, based on the two pieces of motion information, and averages the two predicted signals to generate a bi-predicted signal of the decoding target block. The predicted signal thus generated is output via L207 to the addition unit 205.

The quantized transform coefficients of the residual signal in the decoding target block decoded by the decoding unit 202 are output via L203 to the inverse quantization unit 203. The inverse quantization unit 203 inversely quantizes the quantized coefficients of the residual signal in the decoding target block. The inverse transform unit 204 transforms the inversely quantized data by an inverse discrete cosine transform to generate a residual signal.

The addition unit 205 adds the bi-predicted signal generated by the motion compensation unit 207, to the residual signal reconstructed by the inverse quantization unit 203 and the inverse transform unit 204 and outputs a reproduced pixel signal of the decoding target block via line L205 to the output terminal 206 and the frame memory 104. The output terminal 206 outputs the signal to the outside (e.g., a display).

The frame memory 104 stores the reproduced picture output from the addition unit 205, as a reference frame, which is a reproduced picture for reference for the next decoding process.

Figure 11:
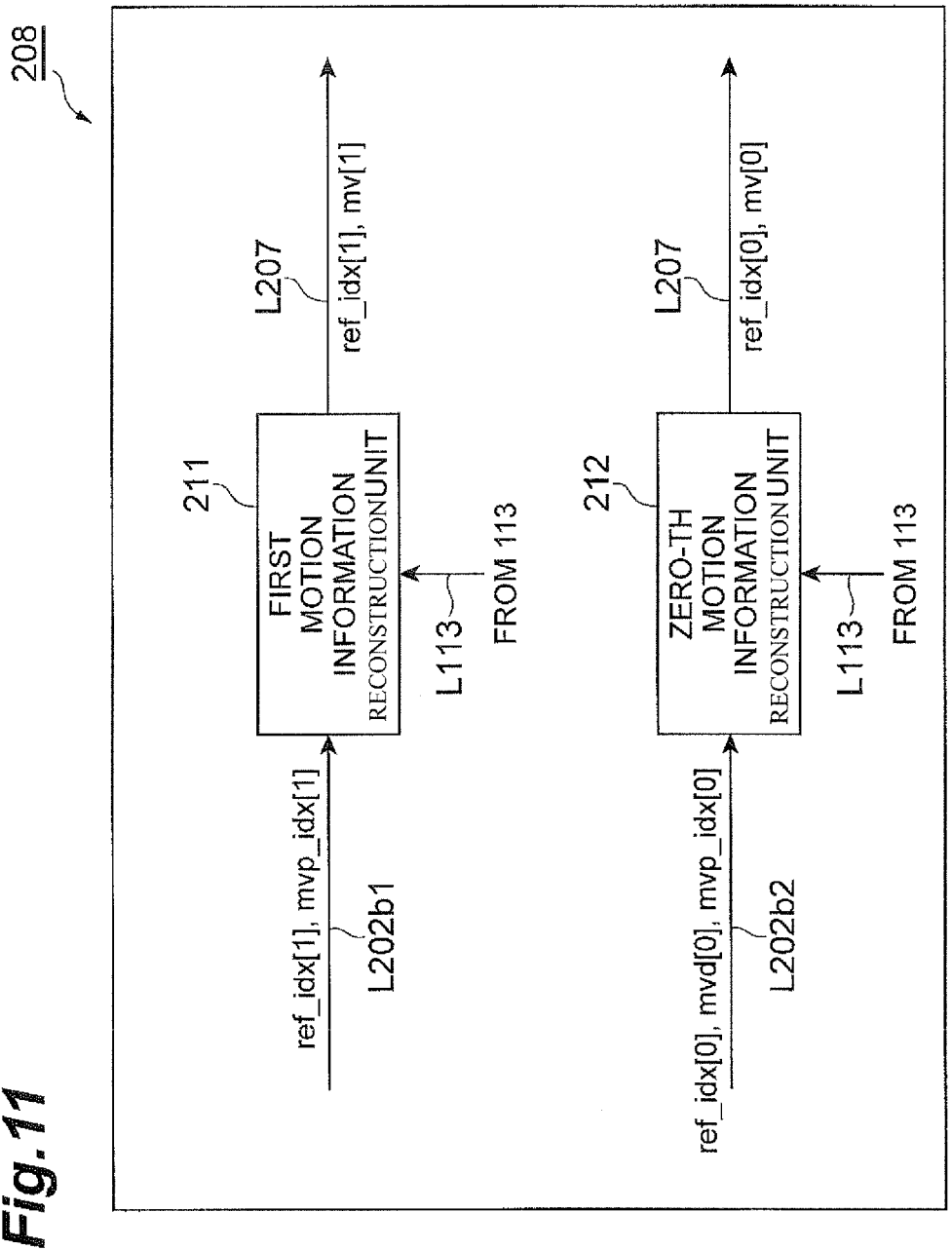
FIG. 11 is a block diagram to illustrate an example of a motion information reconstruction unit shown in FIG. 10.

FIG. 11 is a block diagram showing an example configuration of the motion information reconstruction unit 208 according to the present embodiment. This motion information reconstruction unit 208 is provided with a first motion information reconstruction unit 211 and a zero-th motion information reconstruction unit 212.

These first motion information reconstruction unit 211 and zero-th motion information reconstruction unit 212 can operate simultaneously.

The zero-th motion information reconstruction unit 212 receives input of the zero-th side information (ref_idx[0], mvp_idx[0], mv[0]) to generate the zero-th motion vector predictor (pmv[0][ref_idx[0]][mvp_idx[0]]) from the motion information of the neighboring block obtained via L113, adds the motion vector predictor to the motion vector difference (mvd[0]) in the side information to generate the motion vector in the zero-th motion information, thereby reconstructing the zero-th motion information. Similarly, when the reference frame identified by ref_idx is different from the reference frame identified by ref_idx of the target block, a scaling process of the motion vector in the predictive motion information may be performed based on the frame numbers of the encoding target frame and the two reference frames.

The first motion information reconstruction unit 211 receives input of the first side information (ref_idx[1], mvp_idx[1]) to generate the first motion vector predictor (pmv[1][ref_idx[1]][mvp_idx[1]]) from the previously-decoded motion information obtained via L113. This motion vector predictor is defined as the motion vector in the first motion information (mv[1]=pmv[1][ref_idx[1]][mvp_idx[1]]), thereby reconstructing the first motion information. At this time, the first motion vector may be reconstructed by setting the motion vector difference mvd[1] to a zero vector and adding it to the motion vector predictor. On this occasion, if the reference frame identified by ref_idx is different from the reference frame identified by ref_idx of the target block, a scaling process of the motion vector in the predictive motion information may be performed based on the frame numbers of the encoding target frame and the two reference frames. For example, the motion vector in the predictive motion information is scaled to be converted into a motion vector to the reference frame identified by the target block, and the motion vector after the conversion is used as a motion vector predictor.

Figure 13:
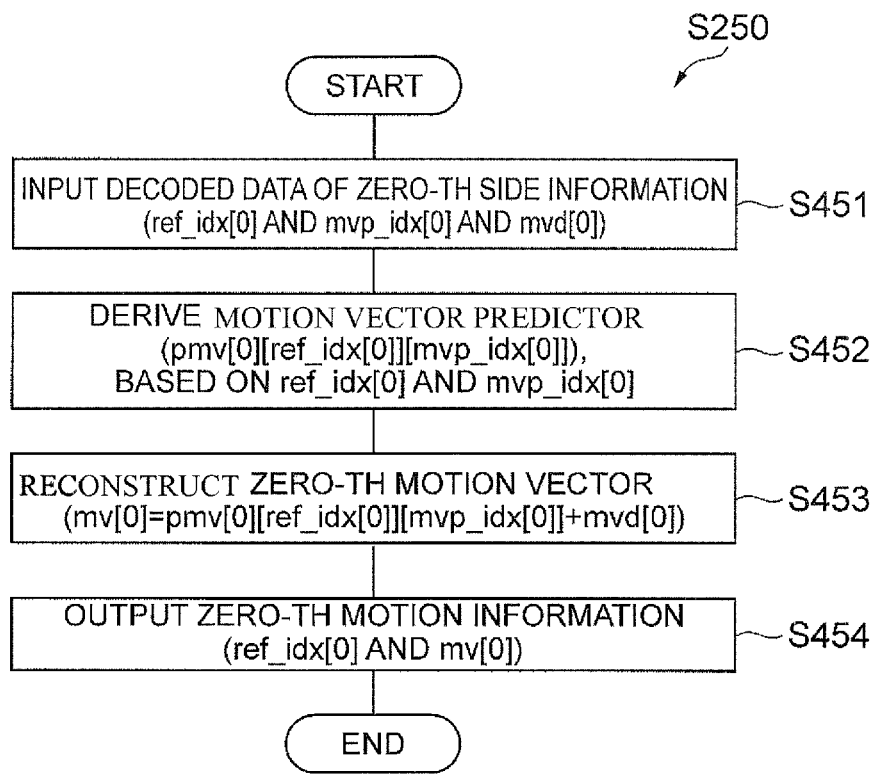
FIG. 13 is a flowchart to illustrate an example of a zero-th motion information reconstruction process shown in FIG. 11.

FIG. 13 shows a flowchart of example operation of the zero-th motion information reconstruction unit 212. First, step S451 is to input decoded data of the zero-th side information (ref_idx[0] and mvp_idx[0] and mvd[0]). Next, step S452 is to input the motion information indicated by mvp_idx[0], from the motion information of the neighboring blocks as shown in the example of FIG. 7 (excluding the motion information of block 400 because it is undetermined), based on ref_idx[0] and mvp_idx[0] thus input, and derive the motion vector predictor (pmv[0][ref_idx[0]][mvp_idx[0]]). At this time, if the reference frame identified by ref_idx is different from the reference frame identified by ref_idx of the target block, a scaling process of the motion vector in the predictive motion information may be performed based on the frame numbers of the encoding target frame and the two reference frames. Thereafter, step S453 is to add the generated motion vector predictor to the motion vector difference to reconstruct the zero-th motion vector (mv[0]=pmv[0][ref_idx[0]][mvp_idx[0]]+mvd[0]). Finally, step S454 is to output the zero-th motion information (ref_idx[0] and mv[0]) to the motion compensation unit 207 and the motion information memory 113, followed by end of processing.

Figure 12:
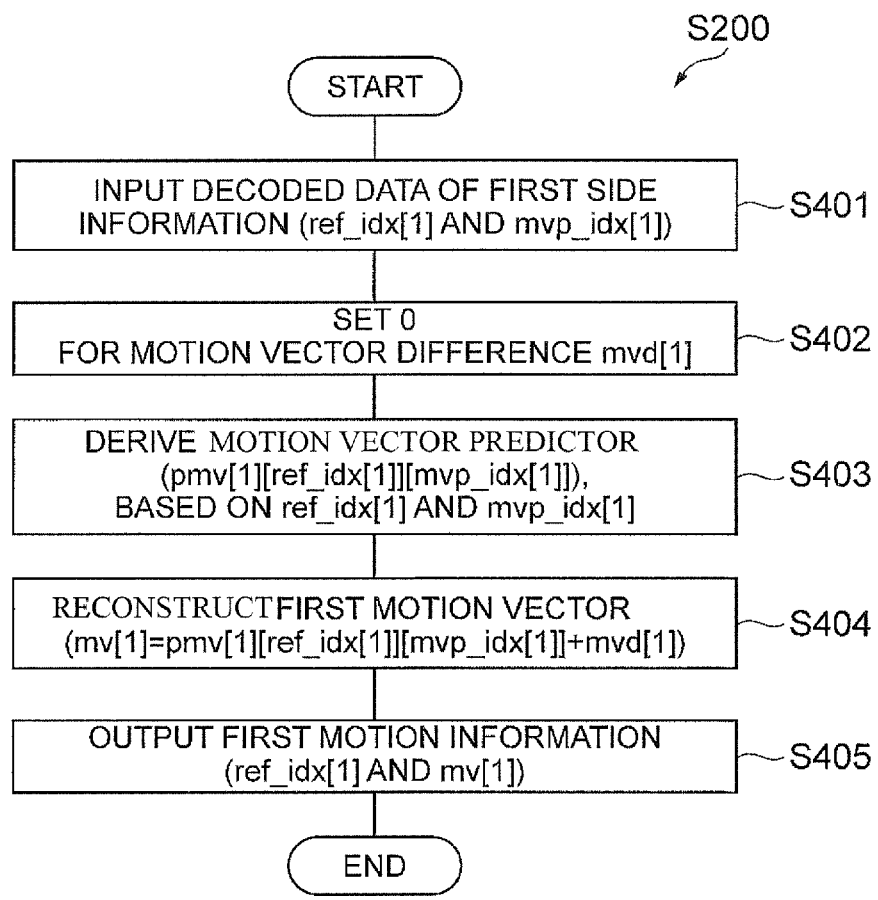
FIG. 12 is a flowchart to illustrate an example of a first motion information reconstruction process shown in FIG. 11.

FIG. 12 shows a flowchart of example operation of the first motion information reconstruction unit 211. First, step S401 is to input decoded data of the first side information (ref_idx[1] and mvp_idx[1]) and step S402 is to set 0 for the vector values of the motion vector difference (mvd[1]). Next, step S403 is to input the motion information indicated by mvp_idx[1] from the previously-decoded motion information (in which n=4 can be included) as shown in the example of FIG. 7, based on ref_idx[1] and mvp_idx[1] thus input, and derive the motion vector predictor (pmv[1][ref_idx[1]][mvp_idx[1]]). At this time, if the reference frame identified by ref_idx is different from the reference frame identified by ref_idx of the target block, a scaling process of the motion vector in the predictive motion information may be performed based on the frame numbers of the encoding target frame and the two reference frames. Thereafter, step S404 is to add the generated motion vector predictor to the motion vector difference to reconstruct the first motion vector (mv[1]=pmv[1][ref_idx[1]][mvp_idx[1]]+mvd[1]). Finally, step S405 is to output the first motion information (ref_idx[1] and mv[1]) to the motion compensation unit 207 and the motion information memory 113, followed by end of processing. Since the vector values of mvd[1] are 0 in this example, step S402 may be omitted and step S404 may be modified so as to set the motion vector predictor to the motion vector (mv[1]=pmv[1][ref_idx[1]][mvp_idx[1]]).

Figure 14:
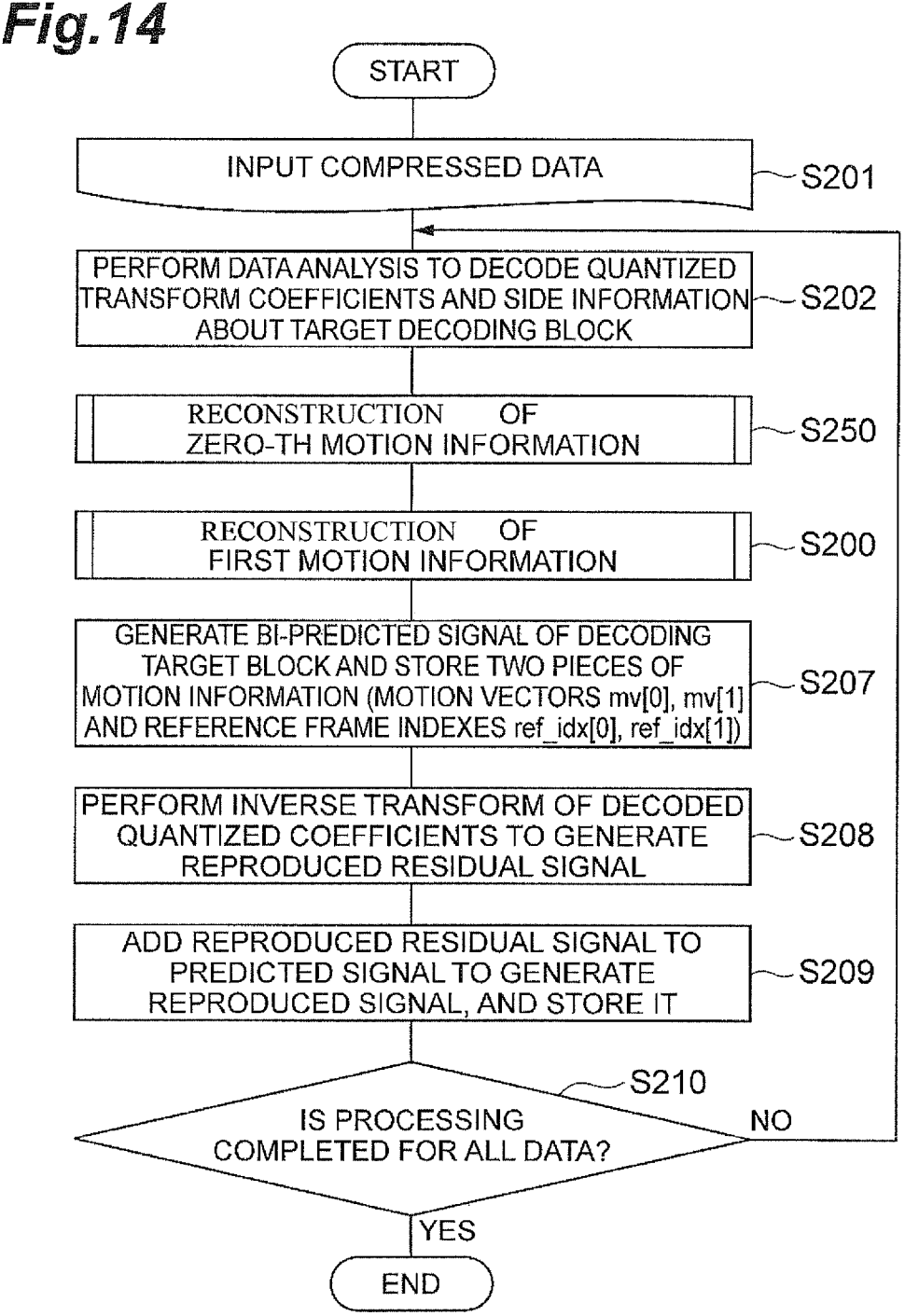
FIG. 14 is a flowchart showing an example of a procedure of a video predictive decoding method of the video predictive decoding device shown in FIG. 10.

Next, the video predictive decoding method in the video predictive decoding device 200 shown in FIG. 10 will be described using the example operational flow diagram of FIG. 14. First, compressed data is input via the input terminal 201 (step S201). Then the decoding unit 202 performs data analysis of the compressed data, and performs entropy decoding thereof to decode the zero-th side information and the first side information used for generation of the bi-predicted signals, and the quantized transform coefficients (step S202).

Next, the zero-th motion information reconstruction unit 212 forming the motion information reconstruction unit 208 reconstructs the zero-th motion information, using the zero-th side information and the motion information of the neighboring blocks stored in the motion information memory 113 (step S250). The details of this step were already described with FIG. 13.

Subsequently, the first motion information reconstruction unit 211 forming the motion information reconstruction unit 208 reconstructs the first motion information, using the first side information and the motion information of the neighboring blocks stored in the motion information memory 113 (step S200). The details of this step were already described with FIG. 12.

Next, the motion compensation unit 207 generates the bi-predicted signal of the decoding target block, based on the reconstructed motion information, and stores the motion information into the motion information memory 113 (S207).

The inverse quantization unit 203 performs the inverse quantization of the quantized transform coefficients decoded by the decoding unit 202 and the inverse transform unit 204 performs the inverse transform to generate a reproduced residual signal (S208). Then the generated bi-predicted signal is added to the reproduced residual signal to generate a reproduced signal and this reproduced signal is stored for reproduction of the next decoding target block into the frame memory 104 (step S209). The processes from S202 to S209 are repeatedly carried out as long as next compressed data exists (S210), and all the data is processed to the last.

Next, a technique of selectively using a plurality of bi-prediction methods including the predictive video coding system will be described. The bi-prediction of encoding only one motion vector difference as described above (which will be referred to as bi-prediction type 2) can be used adaptively in combination with the conventional bi-prediction of encoding two motion vector differences (which will be referred to as bi-prediction type 1) and the uni-prediction. These prediction systems can be used with switching in frame unit, in slice unit of a group of blocks, or in block unit. Switching processes applicable herein include a method of encoding switching information and a method of making the decoder side determine the switching based on the frame numbers of the reference frames.

The switching process between bi-prediction type 1 and bi-prediction type 2 can be implemented by adding to the first motion information estimation unit 121 in FIG. 2, a block matching function and a function to calculate a motion vector difference by subtracting a predictive vector from a motion vector detected by search, and by adding to the first motion information reconstruction unit in FIG. 11, a function to derive a motion vector difference from the decoding unit. Specific methods will be described below.

(Switching in Frame/Slice Unit, and Encoding of Switching Information of Bi-Prediction Type)

For switching between bi-prediction type 1 and bi-prediction type 2 in frame/slice unit, the switching information of bi-prediction type (e.g., BiPred_type) is encoded as included in a header of a frame or a slice.

Figures 5A, 5B:
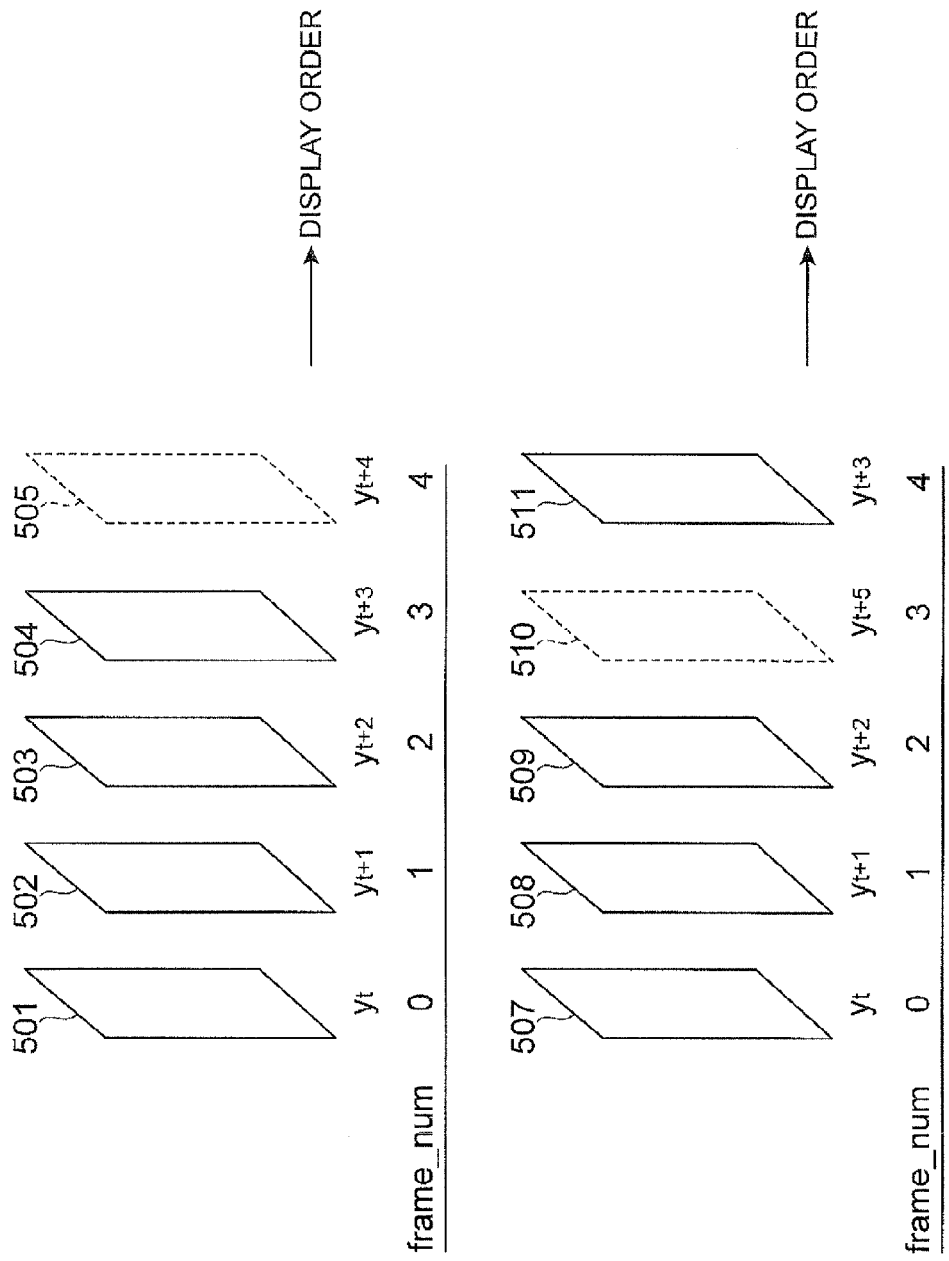
FIGS. 5A and 5B are schematic diagrams to illustrate examples of encoding orders of frames.

When all reference frame candidates are past frames in the display order with respect to the encoding target frame as in FIG. 5(A), bi-prediction type 2 is effective and thus the encoder side selects use of bi-prediction type 2. Then the encoding device encodes indication information to indicate bi-prediction type 2 (e.g., BiPred_type=1), in the header information of a frame or a slice. On the other hand, when the reference frame candidates include a future frame in the display order with respect to the encoding target frame as in FIG. 5(B), the encoding device selects bi-prediction type 1 and encodes indication information to indicate bi-prediction type 1 (e.g., BiPred_type=0), in the header information of a frame or a slice.

When bi-prediction type 1 is used, a motion vector mv[1] is searched for and mvd[1] is included in the first side information, similar to the zero-th side information (encoded data of ref_idx[0] and mvd[0] and mvp_idx[0]), as encoded together with ref_idx[1] and mvp_idx[1], in encoding of a block in a frame or in a slice. When bi-prediction type 2 is used, ref_idx[0] and mvd[0] and mvp_idx[0] are encoded as the zero-th side information, and ref_idx[1] and mvp_idx[1] are encoded as the first side information.

The decoder side switches the reconstruction method of mvd[1], in decoding of each block in a frame or in a slice, based on the indication information decoded from the header information of the frame or the slice. For example, when the indication information indicative of bi-prediction type 1 (e.g., BiPred_type=0) is decoded, the first side information is decoded including mvd[1], together with ref_idx[1] and mvp_idx[1], in decoding of each block in the frame or in the slice. When the indication information indicative of bi-prediction type 2 (e.g., BiPred_type=1) is decoded, the first side information is decoded to obtain ref_idx[1] and mvp_idx[1] and 0 is set for horizontal and vertical vector values of mvd[1], in decoding of each block in the frame or in the slice. The zero-th side information is decoded to obtain ref_idx[0] and mvd[0] and mvp_idx[0], regardless of the value of the indication information.

The switching method between bi-prediction type 1 and bi-prediction type 2 on the encoder side does not have to depend on the method described herein. For example, bi-prediction type 2 may be used if all the reference frames are future frames in the display order with respect to the encoding target frame. It is also possible to adopt a method of checking encoding efficiencies in actual application of bi-prediction type 1 and bi-prediction type 2 (e.g., evaluation values obtained by converting the sum of squared differences of an encoding error signal+encoding bit count) and selecting a type with a higher encoding efficiency.

Figure 8:
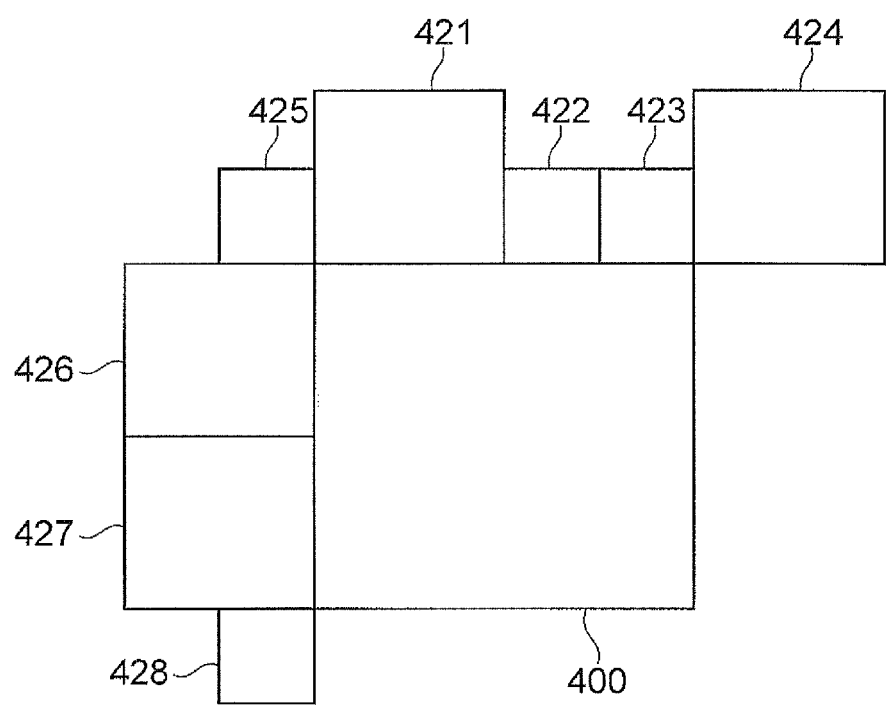
FIG. 8 is a drawing to illustrate another example of neighboring blocks.

Furthermore, in the case of an encoding method of adaptively using a plurality of block sizes as shown in the example of FIG. 8, the indication information indicative of switching between bi-prediction type 1 and bi-prediction type 2 may be individually sent for each of different block sizes, in the frame or slice header. For example, when the block sizes are 64×64, 32×32, 16×16, and 8×8, four pieces of indication information are encoded.

When both of the uni-prediction and bi-prediction are applied to a block prediction method, the encoder side selects a prediction type (uni-prediction or bi-prediction) and encodes it as included in the side information. Then the switching process between bi-prediction type 1 and bi-prediction type 2 is carried out with only blocks for which the bi-prediction is selected. The decoder side performs the switching process between bi-prediction type 1 and bi-prediction type 2 with only blocks for which the information indicative of bi-prediction as a prediction type is decoded.

(Switching in Frame/Slice Unit, and Determination Based on Frame Numbers of Reference Frames)

The reference frame candidates shown in the examples of FIG. 5(A) and FIG. 5(B) are the same on the encoder side and on the decoder side. For this reason, which of bi-prediction type 1 and bi-prediction type 2 is to be used can be determined based on the frame numbers of the reference frame candidates and the frame number of the encoding target frame. For example, bi-prediction type 2 is used when all the reference frame candidates are past frames in the display order with respect to the encoding target frame; bi-prediction type 1 is used when the reference frame candidates include a future frame in the display order with respect to the encoding target frame. This method does not require transmission of indication information.

It is also possible to apply bi-prediction type 2 when all the reference frame candidates are future frames in the display order with respect to the encoding target frame.

(Switching in Block Unit, and Encoding of Switching Information)

In the case of switching between bi-prediction type 1 and bi-prediction type 2 in block unit, the switching information of bi-prediction type (e.g., BiPred_block_type) is encoded as included in the side information of each block.

Since bi-prediction type 2 is effective when two reference frames in bi-prediction are past frames in the display order with respect to the encoding target frame, the encoder side selects use of bi-prediction type 2. Then the encoding device adds indication information indicative of bi-prediction type 2 (e.g., BiPred_block_type=1) to the side information of the block and encodes it together with ref_idx[0], mvd[0], and mvp_idx[0] of the zero-th side information and ref_idx[1] and mvp_idx[1] of the first side information. On the other hand, when the two reference frames in bi-prediction include a future frame in the display order with respect to the encoding target frame, the encoder side selects bi-prediction type 1. Then the encoding device adds indication information indicative of bi-prediction type 1 (e.g., BiPred_block_type=0) to the side information of the block and encodes it together with ref_idx[0], mvd[0], and mvp_idx[0] of the zero-th side information and ref_idx[1], mvd[1] (mvd[1] is included in the first side information), and mvp_idx[1] of the first side information.

The decoder side decodes the side information of the block including the switching information of bi-prediction type (e.g., BiPred_block_type) and switches the reconstruction method of mvd[1], based on a decoded value. Specifically, when the indication information indicative of bi-prediction type 1 (e.g., BiPred_block_type=0) is decoded as the side information of the block, the decoding device decodes ref_idx[0] and mvd[0] and mvp_idx[0] as the zero-th side information and decodes ref_idx[1] and mvd[1] and mvp_idx[1] as the first side information. On the other hand, when the indication information indicative of bi-prediction type 2 (e.g., BiPred_block_type=1) is decoded as the side information of the block, the decoding device decodes ref_idx[0] and mvd[0] and mvp_idx[0] as the zero-th side information, decodes ref_idx[1] and mvp_idx[1] as the first side information, and set 0 for horizontal and vertical vector values of mvd[1].

The switching method between bi-prediction type 1 and the bi-prediction type 2 on the encoder side does not have to depend on the method described herein. For example, when both of the two reference frames are future frames in the display order with respect to the encoding target frame, bi-prediction type 2 may be applied. It is also possible to adopt a method of checking encoding efficiencies in actual application of bi-prediction type 1 and bi-prediction type 2 (e.g., evaluation values obtained by converting the sum of squared differences of an encoding error signal+encoding bit count) for each block, and selecting a type with a higher encoding efficiency.

When both of the uni-prediction and bi-prediction are applied to the block prediction method, the encoder side selects a prediction type (uni-prediction or bi-prediction) and encodes it as included in the side information. Then the switching process between bi-prediction type 1 and bi-prediction type 2 is carried out with only blocks for which the bi-prediction is selected. The decoder side performs the switching process between bi-prediction type 1 and bi-prediction type 2 with only blocks for which the information indicative of bi-prediction as a prediction type is decoded.

(Switching in Block Unit, and Determination Based on Frame Numbers of Reference Frames)

The reference frame candidates shown in the examples of FIG. 5(A) and FIG. 5(B) are the same on the encoder side and the decoder side. For this reason, which of bi-prediction type 1 and bi-prediction type 2 is to be used can be determined based on the frame numbers of the two reference frames used in bi-prediction, which are encoded/decoded as the side information of block, and the frame number of the encoding target frame. For example, bi-prediction type 2 is applied when the two reference frames used in the bi-prediction both are past frames in the display order with respect to the encoding target frame; bi-prediction type 1 is applied when either or both of the two reference frames are future frames in the display order with respect to the encoding target frame. This method does not require transmission of indication information. Bi-prediction type 2 may be applied when both of the two reference frames are future frames in the display order with respect to the encoding target frame.

(Combination of Switching in Frame/Slice Unit and Switching in Block Unit)

In frame/slice unit, indication information to indicate whether the switching of bi-prediction type is to be performed in frame/slice unit or in block unit is encoded/decoded.

When the switching of bi-prediction type is carried out in frame/slice unit, the switching information of bi-prediction type (e.g., BiPred_type) is additionally encoded/decoded as included in a header of a frame or a slice, as described above. On this occasion, in the case of the encoding method of adaptively using a plurality of block sizes as shown in the example of FIG. 8, the indication information to indicate switching between bi-prediction type 1 and bi-prediction type 2 may be individually sent for each of different block sizes, in the frame or slice header. For example, when the block sizes are 64×64, 32×32, 16×16, and 8×8, four pieces of indication information are encoded.

When the switching of bi-prediction type is carried out in block frame unit, the switching information of bi-prediction type (e.g., BiPred_block_type) is additionally encoded/decoded as included in the side information of a block, in block unit, as described above. On this occasion, further, in the case of the encoding method of adaptively using a plurality of block sizes as shown in the example of FIG. 8, indication information to indicate whether the switching process between bi-prediction type 1 and bi-prediction type 2 is to be carried out may be individually transmitted for each of different block sizes, in the frame or slice header. For example, when the block sizes are 64×64, 32×32, 16×16, and 8×8, four pieces of indication information are encoded.

It is also possible to encode/decode indication information to indicate application of only bi-prediction type 1, application of only bi-prediction type 2, or switching between the two bi-prediction types in each block in a frame/slice, in frame/slice unit. On this occasion, in the case of the encoding method of adaptively using a plurality of block sizes as shown in FIG. 8, the indication information may be individually transmitted for each of different block sizes.

In another method, indication information to indicate whether bi-prediction type 2 is to be applied is encoded/decoded in frame/slice unit. In a frame/slice using bi-prediction type 2, indication information may be further encoded/decoded to indicate whether switching between bi-prediction type 1 and bi-prediction type 2 is to be performed in each block in the frame/slice, or to indicate whether bi-prediction type 2 is applied to all the blocks in the frame/slice. On this occasion, in the case of the encoding method of adaptively using a plurality of block sizes as shown in FIG. 8, these pieces of indication information may be individually transmitted for each of the different block sizes, in the frame or slice header.

In the above description, the zero-th motion information of the target block 400 was included in the candidates for the first motion vector predictor shown in FIG. 7. However, it is also possible to separately prepare as bi-prediction type 3 a method of defining the zero-th motion information as first predictive motion information, scaling the predictive motion information, based on the first reference frame index included in the zero-th motion information and the first reference frame index included in the first motion information, and using the scaled result as first motion information. For example, the scaling is performed so that the motion vector included in the zero-th motion information becomes the motion vector of the reference frame indicated by the reference frame index of the first motion information. In this case, the zero-th motion information of the target block does not have to be included in the candidates for the first predictive motion information in bi-prediction type 2 (n=4 in FIG. 7 is excluded from the candidates). When bi-prediction type 3 is applied, encoding/decoding of the first motion vector predictor index is not carried out. For example, the first side information is encoded/decoded, including the first reference frame index (ref_idx[1]) but not including the motion vector difference (mvd[1]) and the first motion vector predictor index (mvp_idx[1]).

An application method of bi-prediction type 3 may be to encode/decode indication information to indicate switching among bi-prediction type 1, bi-prediction type 2, and bi-prediction type 3, in frame/slice unit or in block unit. It is also possible to encode/decode indication information to indicate switching between bi-prediction type 1 and bi-prediction type 3, or, switching between bi-prediction type 2 and bi-prediction type 3, in frame/slice unit or in block unit.

It is also conceivable to employ a method of using it as a substitute for bi-prediction type 1 in the above description. For example, bi-prediction type 3 is applied when the plurality of reference frame candidates include a future frame in the display order with respect to the encoding target frame; bi-prediction type 2 is applied when the plurality of reference frame candidates all are past frames in the display order with respect to the encoding target frame.

In another applicable method, when the reference frame indicated by the reference frame index in the zero-th motion information is different from the reference frame indicated by the reference frame index in the first motion information, bi-prediction type 3 is applied instead of bi-prediction type 2 (with no need for encoding/decoding of the first motion vector predictor index). On the other hand, when the reference frame indicated by the reference frame index in the zero-th motion information is the same as the reference frame indicated by the reference frame index in the first motion information, bi-prediction type 2 is applied (with encoding/decoding of the first motion vector predictor index).

The switching information of bi-prediction type does not have to be limited to the identification information such as BiPred_type or BiPred_block_type. It may be any information to indicate whether encoding/decoding of motion vector difference is to be carried out. For example, flag information may be encoded/decoded to indicate whether mvd is included in the first side information or in the zero-th side information like mvd_list1_zero_flag or mvd_list0_zero_flag. When bi-prediction type 1, bi-prediction type 2, and bi-prediction type 3 are switched in frame/slice unit or in block unit, a flag to indicate that mvd is not included in the side information is sent in application of either of bi-prediction type 2 and bi-prediction type 3. The switching between bi-prediction type 2 and bi-prediction type 3 may be performed based on the reference frame indexes as described above (bi-prediction type 2 is applied when the reference frame indicated by the reference frame index in the zero-th motion information is the same as the reference frame indicated by the reference frame index in the first motion information), and selection information may be further encoded/decoded.

Figure 15A:
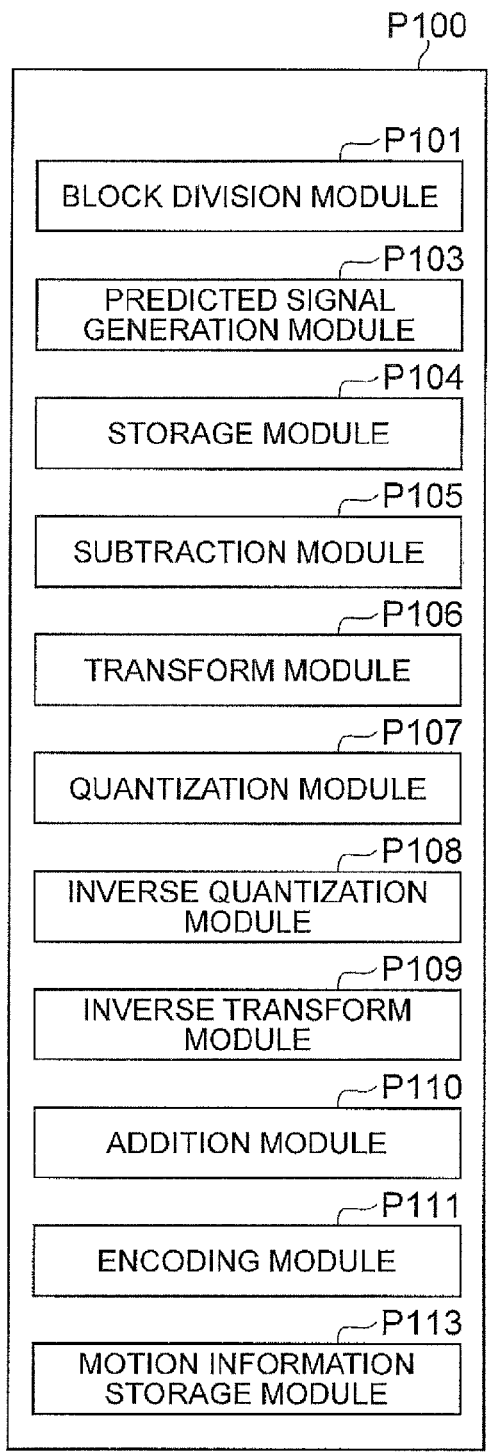
FIGS. 15A and 15B are block diagram examples of modules used to execute video predictive encoding according to an embodiment.
Figure 15B:
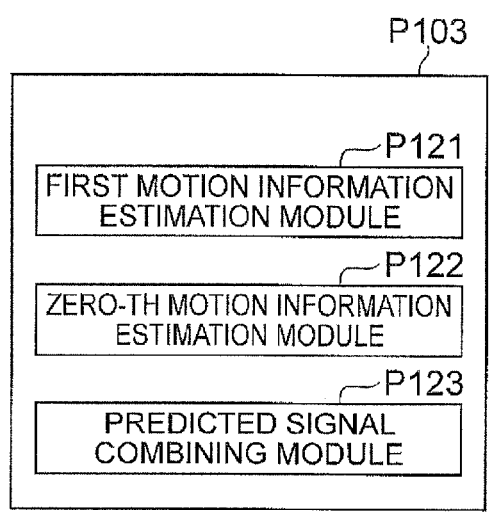

FIG. 15 is a block diagram showing examples of modules that can be used during execution of circuitry for the video predictive encoding method. As shown in FIG. 15(A), the video predictive encoding program P100 is provided with a block division module P101, a predicted signal generation module P103, a storage module P104, a subtraction module P105, a transform module P106, a quantization module P107, an inverse quantization module P108, an inverse transform module P109, an addition module P110, an encoding module P111, and a motion information storage module P113. Furthermore, as shown in FIG. 15(B), the predicted signal generation module P103 is provided with a first motion information estimation module P121, a zero-th motion information estimation module P122, and a predicted signal combining module P123. The functions implemented by execution of the above respective modules can be included in the functions of the above-described video predictive encoding device 100. For example, the functions provided by the respective modules in the video predictive encoding program P100 can be included in the functions of the block division unit 102, predicted signal generation unit 103, frame memory 104, subtraction unit 105, transform unit 106, quantization unit 107, inverse quantization unit 108, inverse transform unit 109, addition unit 110, encoding unit 111, motion information memory 113, first motion information estimation unit 121, zero-th motion information estimation unit 122, and predicted signal combining unit 123.

Figure 16A:
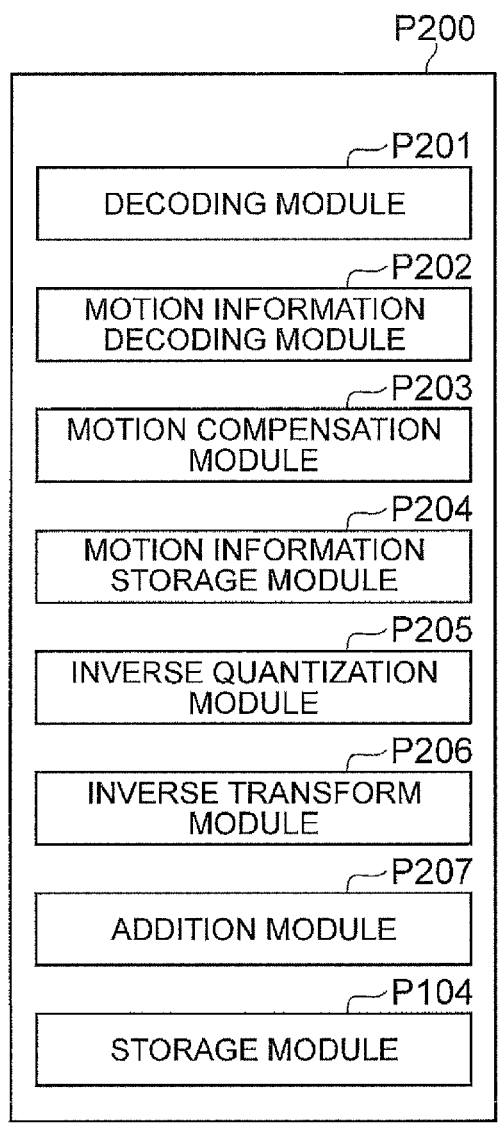
FIGS. 16A and 16B are block diagram examples of modules used to execute video predictive decoding method according to an embodiment.
Figure 16B:
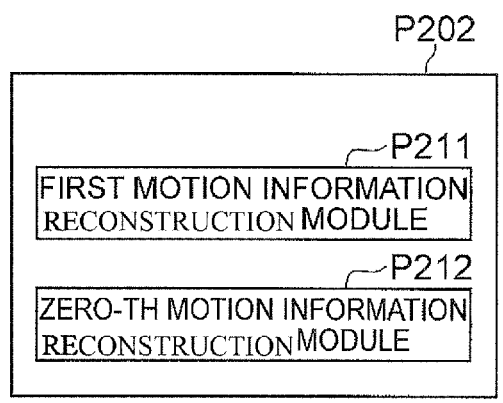

FIG. 16 is a block diagram showing examples of modules that can be used during execution of circuitry for the video predictive decoding method. As shown in FIG. 16(A), the video predictive decoding program P200 is provided with a decoding module P201, a motion information decoding module P202, a motion compensation module P203, a motion information storage module P204, an inverse quantization module P205, an inverse transform module P206, an addition module P207, and a storage module P104. Furthermore, as shown in FIG. 16(B), the motion information decoding module P202 is provided with a first motion information reconstruction module P211 and a zero-th motion information reconstruction module P212.

The functions implemented by execution of the above respective modules can be include in those of the components of the aforementioned video predictive decoding device 200. For example, the functions provided by the respective modules in the video predictive decoding program P200 can be included in the functions of the decoding unit 202, motion information reconstruction unit 208, motion compensation unit 207, motion information memory 113, inverse quantization unit 203, inverse transform unit 204, addition unit 205, frame memory 104, first motion information reconstruction unit 211, and zero-th motion information reconstruction unit 212.

The video predictive encoding program P100 or the video predictive decoding program P200 configured as described above can be stored in a below-described storage medium 10, working memory 14 and/or memory 16 shown in FIGS. 17 and 18, and is executed by circuitry, such as included in a computer described below.

Figure 17:
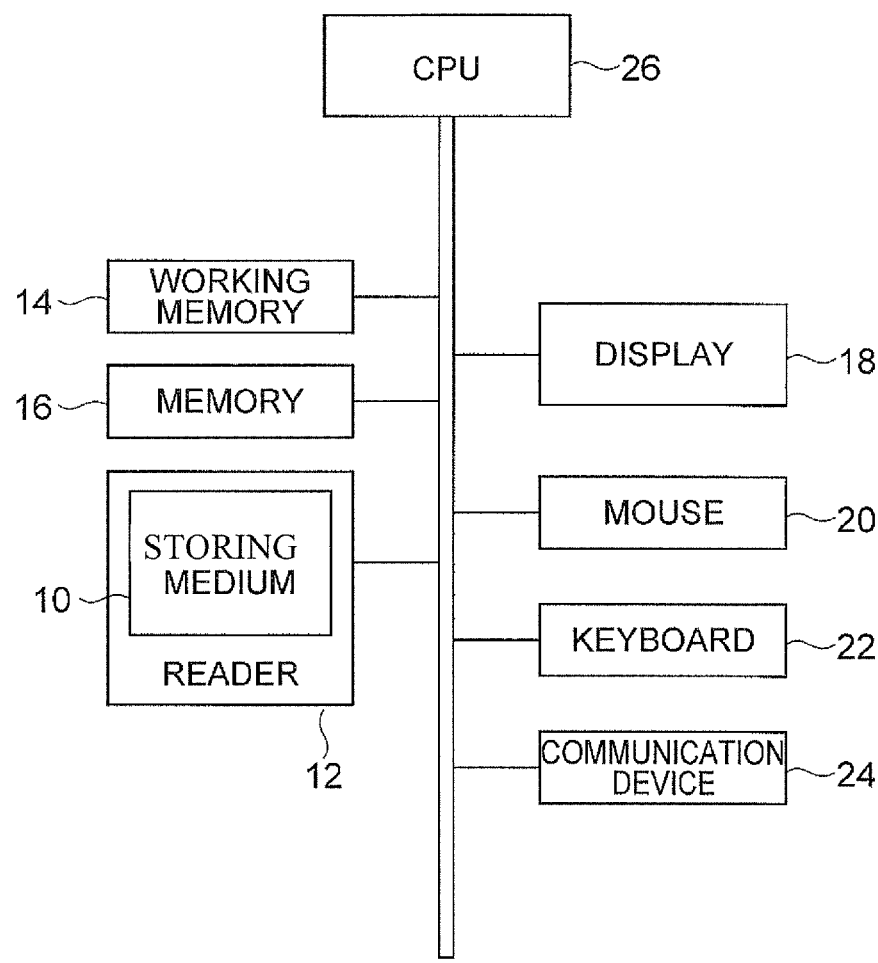
FIG. 17 is a drawing showing an example hardware configuration of a computer.
Figure 18:
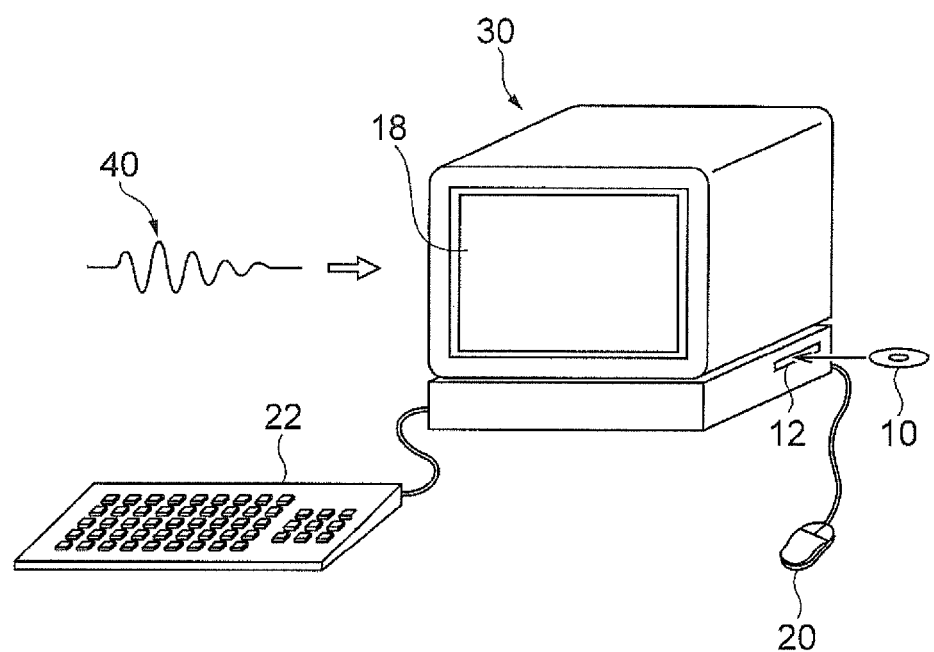
FIG. 18 is a perspective view of an example computer.
Figure 20A:
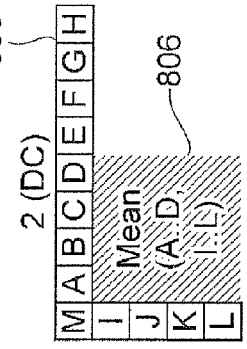
FIGS. 20A through 20I are schematic diagrams to illustrate an example of intra-frame prediction.
Figure 20B:
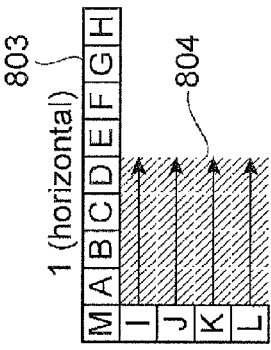
Figure 20C:
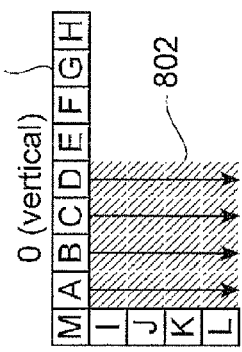
Figure 20D:
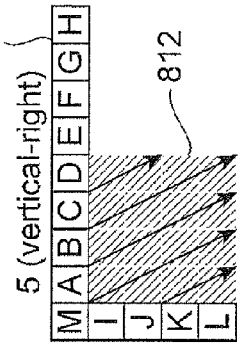
Figure 20E:
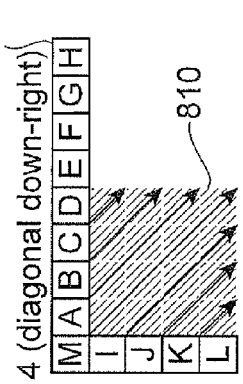
Figure 20F:
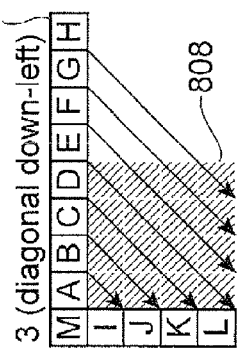
Figure 20G:
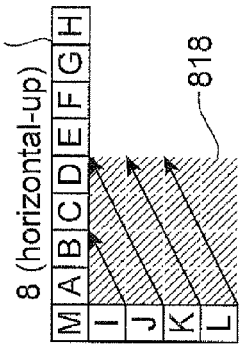
Figure 20H:
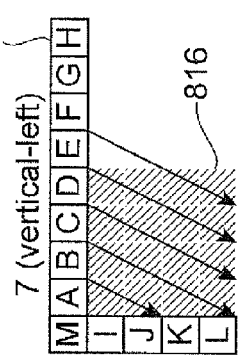
Figure 20I:
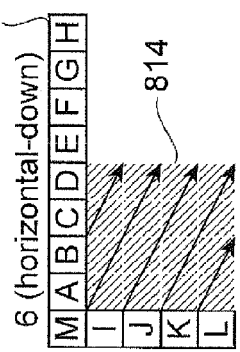

FIG. 17 is a drawing showing an example of a hardware circuitry configuration of a computer for executing a program stored in a storage medium and FIG. 18 an example of a perspective view of a computer for executing a program stored in a storage medium. The equipment for executing the program stored in the storage medium is not limited to computers, but may be a DVD player, a set-top box, a cell phone, or the like provided with circuitry that includes a CPU and is configured to perform processing and control based on the circuitry or circuitry and software.

As shown in FIG. 17, the computer 30 is provided with circuitry that includes a reading device 12 such as a flexible disk drive unit, a CD-ROM drive unit, or a DVD drive unit, a communication port such as a universal serial bus port (USB), Bluetooth port, an infrared communication port, or any other type of communication port that allows communication with an external device, such as another computer or memory device. The computer 30 may also include a working memory 14 that may include an operating system, a memory 16 that stores data, such as at least part of a program such as a program stored in the storing medium 10. In addition, the working memory 14 and/or the memory 16 may include the memory 104 and the memory 113. The working memory 14 and memory 16 may be one or more computer readable storage medium that is other than a transitory signal, and can include a solid-state memory such as a memory card or other package that houses one or more non-volatile memories, such as read-only memories. Further, the computer readable medium can include a random access memory or other volatile re-writable memory. Additionally or alternatively, the computer-readable medium can include a magneto-optical or optical medium, such as a disk or tapes or any other non-transitory information storage medium to capture carrier wave signals such as a signal communicated over a transmission medium. A digital file attachment to an e-mail, stored in a storage medium, or other self-contained information archive or set of archives may be considered a non-transitory distribution medium that is a tangible computer readable storage medium. Accordingly, the embodiments are considered to include any one or more of a computer-readable storage medium or a non-transitory distribution storage medium and other equivalents and successor information storage media, in which data or instructions may be stored. In addition, the computer 30 may have user interface circuitry that includes, a monitor unit 18 such as a display, a mouse 20 and a keyboard 22 as input devices, a touch screen display, a microphone for receipt of voice commands, a sensor, or any other mechanism or device that allows a user to interface with the computer 30. In addition, the circuitry of the computer 30 may include a communication device 24 for transmission/reception of data and others, and a central processing unit (CPU) 26, or processor, to control execution of the program. The processor 26 may be one or more one or more general processors, digital signal processors, application specific integrated circuits, field programmable gate arrays, digital circuits, analog circuits, combinations thereof, and/or other now known or later developed circuitry and devices for analyzing and processing data. In an example, when the storing medium 10 is put into the reading device 12, the computer 30 becomes accessible to the video predictive encoding or decoding program stored in the storing medium 10, through the reading device 12, and becomes able to operate as the video encoding device or the video decoding device according to the present embodiment, based on the image encoding or decoding program.

As shown in FIG. 18, the video predictive encoding program and the video decoding program may be provided in the form of computer data signal 40 superimposed on a carrier wave, through a network. In this case, the computer 30 stores the video predictive encoding program or the video decoding program received through the communication device 24, into the memory 16 and becomes able to execute the video predictive encoding program or the video predictive decoding program.

In the predictive video coding system, it is possible to further employ modifications as described below.

(1) Relation Between Zero-Th Side Information and First Side Information

In the above description the first side information contains ref_idx[1] and mvp_idx[1] and the zero-th side information contains ref_idx[0] and mvd[0] and mvp_idx[0]; however, this configuration may be reversed. Specifically, the first side information contains ref_idx[1] and mvd[1] and mvp_idx[1] and the zero-th side information contains ref_idx[0] and mvp_idx[0]. In this case, the zero-th predictive motion information is generated from the motion information of the neighboring blocks, the zero-th predicted signal is generated, and then a search is conducted for the first motion information to minimize the evaluation value of the sum of absolute differences between the bi-predicted signal and the original signal of the target block+the side information.

In another available method, the first side information contains ref_idx[1] and mvp_idx[1] and the zero-th side information contains ref_idx[0] and mvp_idx[0]. For example, the motion vector difference is not encoded and the decoder side sets 0 for the horizontal and vertical vector values of the two motion vector differences. In another method, the zero-th motion vector predictor and the first motion vector predictor are set to the zero-th motion vector and the first motion vector, respectively.

(2) Reference Frames

In the above description, the reference frame index is encoded/decoded as included in the first side information, but it may be determined based on the reference frame index associated with the motion information of the neighboring block indicated by mvp_idx (for example, for the neighboring blocks 401 to 404 in FIG. 7, the associated reference frame index in List1 is used as it is and, for the neighboring blocks 410 to 415, a scaling process is applied to a motion vector in a neighboring block, based on the difference between reference frames indicated by the reference frame indexes of the target block and the neighboring block). Furthermore, the reference frame index of the first motion information may be preliminarily determined. Since the reference frame index can be uniquely reconstructed on the decoder side in these cases, the reference frame index ref_idx does not have to be encoded as included in the first side information.

The selection of reference frames and the lists thereof are not limited to the examples of FIG. 5 and FIG. 6. The reference frame lists may be encoded in frame/slice unit, and the number of reference frames does not always have to be 4 as in FIG. 5, but may be carried out with any other number.

(3) Predictive Motion Information

The above embodiments used plural pieces of previously-encoded/previously-decoded motion information as candidates for predictive motion information as shown in FIG. 7, but the number and positions of neighboring blocks to be used are not limited to those.

The bi-prediction can also be carried out in a configuration wherein the zero-th motion vector of the neighboring block is included in the candidates for the first motion vector predictor and the first motion vector of the neighboring block is included in the candidates for the zero-th motion vector predictor. The zero-th motion information encoded/decoded before may be added to the candidates for first predictive motion information.

The predictive video coding system is not limited, either, as to whether the scaling process of motion vector is to be carried out when the reference frame index in the previously-encoded/previously-decoded motion information is different from the reference frame index in the motion information associated with the target block.

When there is only one candidate for motion vector predictor, the motion vector predictor index mvp_idx does not have to be encoded as included in the first side information.

In the predictive video coding system there are no restrictions on the method of generating the motion vector predictor, either. For example, it is also possible to adopt as a motion vector predictor the median of an odd number of candidates for motion vector predictor. Since the motion vector predictor is also uniquely determined on the decoder side in this case, the motion vector predictor index mvp_idx does not have to be encoded as included in the first side information.

The bi-prediction of the predictive video coding system can also be carried out in the case of the encoding/decoding method using a plurality of block sizes, as shown in FIG. 8, as long as a method for determining the candidates for predictive motion information is defined. For example, in the example of FIG. 8, it is possible to define blocks 421 to 428 adjacent to the target block 400 as candidates for predictive information, or to preliminarily determine a numbering method of neighboring blocks and set motion information of neighboring blocks as many as a number designated in frame unit or in slice unit, as candidates for motion vector predictor.

(4) Zero-Th Motion Information and Side Information

In the predictive video coding system there are no restrictions on the configurations of the zero-th motion information and the side information; the reference frame index and the motion vector predictor index may be set as fixed values, without being encoded, or they may be derived by a predetermined method.

As for the zero-th motion information and side information, similar to the first motion information and side information, the decoder side may set mv[0]=pmv[0] (or mvd[0]=0), without encoding mvd[0].

(5) Frame Numbers

In the above description the frame number (frame_num) is used to identify each of the reference frames and encoding target frame, but any other information may be used, without influence on implementation of the predictive video coding system, as long as it is information that allows identification of each reference frame.

(6) Reconstruction of First Motion Vector Difference mvd[1]

In the above-described bi-prediction of the predictive video coding system, the vector values of the first motion vector difference mvd[1] are 0. For this reason, without encoding mvd[1], the decoder side sets 0 for the vector values of mvd[1] or sets the motion vector mv[1] to pmv[1]. Another effective embodiment can be a method of including mvd[1]=0 in the first side information and efficiently entropy encoding zeros.

When arithmetic coding is used for the entropy encoding, for example, the zero-th motion vector difference and the first motion vector difference are encoded/decoded by different probability models. For example, two probability models with different probability frequencies of vector values 0 of motion vector difference are prepared for encoding/decoding of the motion vector difference. Then the second probability model with the higher frequency of vector values 0 of motion vector difference is used for encoding/decoding of the first motion vector difference, and the other first probability model is used for encoding/decoding of the zero-th motion vector difference. Furthermore, different probability models may also be prepared for horizontal and vertical vector values of motion vector difference.

In another applicable method, the second probability model is used for only the first motion vector difference of each block to which bi-prediction type 2 is applied, and the first probability model is used for encoding/decoding of the motion vector differences of the other blocks.

When variable-length coding is applied, the zero-th motion vector difference and the first motion vector difference are encoded/decoded using different variable-length code tables. For example, two variable-length code tables with different code lengths assigned to vector values 0 of the motion vector difference are prepared. Then the second variable-length code table with a shorter code length assigned to vector values 0 of the motion vector difference is used for encoding/decoding of the first motion vector difference, and the other first variable-length code table is used for encoding/decoding of the zero-th motion vector difference. Furthermore, separate variable-length code tables may be prepared for horizontal and vertical vector values of motion vector difference.

In another applicable method, the second variable-length code table is used for only the first motion vector difference of each block to which bi-prediction type 2 is applied, and the first variable-length code table is used for encoding/decoding of the motion vector differences of the other blocks.

(7) N-Prediction

In the above description the prediction types of inter-frame prediction are uni-prediction and bi-prediction, but the predictive video coding system can also be applied to prediction methods of combining three or more predicted signals. When the predicted signal is generated by combining three or more predicted signals, the number of pieces of side information without mvd may be any number not less than 1.

(8) Transform Unit and Inverse Transform Unit

The transform process of residual signal may be carried out in a fixed block size or the transform process may be carried out in each of sub-regions obtained by subdividing a target region into the sub-regions.

(9) Color Signal

There is no specific description about color format in the above embodiments, but the predicted signal generation process may also be carried out for color signal or color-residual signal, separately from luminance signal. It may also be carried out in synchronization with the processing of luminance signal.

The predictive video coding system was described above in detail on the basis of the embodiments thereof. It should be, however, noted that the predictive video coding system is by no means limited to the above embodiments. The predictive video coding system can be modified in various ways without departing from the scope and spirit of the described embodiments.

LIST OF REFERENCE SIGNS

100: video predictive encoding device; 101: input terminal; 102: block division unit; 103: predicted signal generation unit; 104: frame memory; 105: subtraction unit; 106: transform unit; 107: quantization unit; 108: inverse quantization unit; 109: inverse transform unit; 110: addition unit;

111: encoding unit; 112: output terminal; 113: motion information memory; 121: first motion information estimation unit; 122: zero-th motion information estimation unit; 123: predicted signal combining unit; 201: input terminal; 202: decoding unit; 203: inverse quantization unit; 204: inverse transform unit; 205: addition unit; 206: output terminal; 207: motion compensation unit; 208: motion information reconstruction unit; 211: first motion information reconstruction unit; 212: zero-th motion predictive information reconstruction unit.

What is claimed is:

1. A video predictive decoding device comprising:
a decoding unit which decodes a compressed data out of plural sets of compressed data obtained by encoding a plurality of divided regions, the compressed data comprising side information and a residual signal of a target region, which is a target to be decoded;
a motion information reconstruction unit which reconstructs a motion vector used to generate a predicted signal of the target region from the side information;
a motion information storage which stores the motion vector;
a motion compensation unit which generates the predicted signal of the target region, based on the motion vector;
a residual signal reconstruction unit which reconstructs a reproduced residual signal of the target region from the compressed data comprising the residual signal; and
a picture storing unit which adds the predicted signal to the reproduced residual signal to reconstruct a pixel signal of the target region, and which stores the reconstructed pixel signal as a previously-reproduced picture,
wherein the decoding unit decodes zero-th side information and first side information, wherein the zero-th side information contains a zero-th motion vector difference, and a zero-th motion vector predictor index used to identify as a zero-th motion vector predictor one motion vector selected from a plurality of motion vectors stored in the motion information storage,
wherein the first side information contains a first motion vector predictor index used to identify as a first motion vector predictor one motion vector selected from a plurality of motion vectors stored in the motion information storage,
wherein the motion information reconstruction unit comprises:
a zero-th motion information reconstruction unit, which generates the zero-th motion vector predictor based on the zero-th motion vector predictor index, and which adds the generated zero-th motion vector predictor to the zero-th motion vector difference to reconstruct a zero-th motion vector; and
a first motion information reconstruction unit, which generates the first motion vector predictor based on the first motion vector predictor index to reconstruct the generated first motion vector predictor as a first motion vector,
wherein the motion compensation unit combines two signals obtained from the previously-reproduced picture, based on the zero-th motion vector and the first motion vector, to generate the predicted signal of the target region,
wherein the decoding unit is configured to further decode indication information to indicate whether the first side information contains a motion vector difference, in each frame or in each slice, and
when the indication information indicates that the first side information does not contain the first motion vector difference, the first motion information reconstruction unit is configured to generate the first motion vector predictor based on the first motion vector predictor index, and reconstruct the generated first motion vector predictor as the first motion vector.

2. A video predictive decoding method executed by a video predictive decoding device, comprising:
a decoding step of decoding a compressed data out of plural sets of compressed data obtained by encoding a plurality of divided regions, the compressed data comprising side information and a residual signal of a target region, which is a target to be decoded;
a motion information reconstruction step of reconstructing a motion vector used to generate a predicted signal of the target region from the side information;
a motion information storing step of storing the motion vector in a motion information storing means;
a motion compensation step of generating the predicted signal of the target region, based on the motion vector,
a residual signal reconstruction step of reconstructing a reproduced residual signal of the target region from the compressed data comprising the residual signal; and
a picture storing step of adding the predicted signal to the reproduced residual signal to reconstruct a pixel signal of the target region, and storing the reconstructed pixel signal as a previously-reproduced picture,
wherein in the decoding step, the video predictive decoding device decodes zero-th side information and first side information,
wherein the zero-th side information contains a zero-th motion vector difference, and a zero-th motion vector predictor index used to identify, as a zero-th motion vector predictor, one motion vector selected from a plurality of motion vectors stored in the motion information storing step,
wherein the first side information contains a first motion vector predictor index used to identify as a first motion vector predictor one motion vector selected from a plurality of motion vectors stored in the motion information storing step,
wherein the motion information reconstruction step comprises:
a zero-th motion information reconstruction step of generating the zero-th motion vector predictor based on the zero-th motion vector predictor index, and adding the generated zero-th motion vector predictor to the zero-th motion vector difference to reconstruct a zero-th motion vector, and
a first motion information reconstruction step of generating the first motion vector predictor based on the first motion vector predictor index, to reconstruct the generated first motion vector predictor as a first motion vector,
wherein in the motion compensation step, the video predictive decoding device combines two signals derived from the previously-reproduced picture, based on the zero-th motion vector and the first motion vector, to generate the predicted signal of the target region,
wherein in the decoding step, the video predictive decoding device further decoding, in each frame or in each slice, indication information to indicate whether the first side information contains a motion vector difference, and
wherein in the first motion information reconstruction step, when the indication information indicates that the first side information does not contain the first motion vector difference, the video predictive decoding device generating the first motion vector predictor, based on the first motion vector predictor index, and reconstructing the generated first motion vector predictor as the first motion vector.

\* \* \* \* \*

UNITED STATES PATENT AND TRADEMARK OFFICE
CERTIFICATE OF CORRECTION

PATENT NO. : 9,788,005 B2
APPLICATION NO. : 15/357696
DATED : October 10, 2017
INVENTOR(S) : Yoshinori Suzuki et al.

It is certified that error appears in the above-identified patent and that said Letters Patent is hereby corrected as shown below:

In the Claims

In Column 34, Claim 2, Line 21, immediately after "based on the motion vector" replace "," with --;--.

Signed and Sealed this
First Day of May, 2018

Andrei Iancu
*Director of the United States Patent and Trademark Office*